United States Patent
Ausserlechner

(10) Patent No.: US 11,506,517 B2
(45) Date of Patent: Nov. 22, 2022

(54) MAGNETIC ANGULAR POSITION SENSOR

(71) Applicant: Infineon Technologies AG, Neubiberg (DE)

(72) Inventor: Udo Ausserlechner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/395,419

(22) Filed: Aug. 5, 2021

(65) Prior Publication Data
US 2021/0364325 A1 Nov. 25, 2021

Related U.S. Application Data

(62) Division of application No. 16/656,912, filed on Oct. 18, 2019, now Pat. No. 11,092,463, which is a
(Continued)

(30) Foreign Application Priority Data

Feb. 25, 2016 (DE) .......................... 102016103325.1

(51) Int. Cl.
*G01D 5/14* (2006.01)
*G01D 5/20* (2006.01)
(Continued)

(52) U.S. Cl.
CPC .......... *G01D 5/2006* (2013.01); *G01D 5/145* (2013.01); *G01D 5/24442* (2013.01)

(58) Field of Classification Search
CPC . G01D 5/14; G01D 5/20; G01D 5/244; G01B 7/14; G01B 7/30; G01R 33/02; G01R 33/07
See application file for complete search history.

(56) References Cited

U.S. PATENT DOCUMENTS 9,018,943 B2  4/2015 Schrubbe
9,182,249 B2  11/2015 Suzuki et al.
(Continued)

FOREIGN PATENT DOCUMENTS

CN  101750100 A  6/2010
CN  102297652 A  12/2011
(Continued)

OTHER PUBLICATIONS

Office Action dated Jan. 16, 2018 for German Application No. 102016103325.1.
(Continued)

*Primary Examiner* — Neel D Shah
(74) *Attorney, Agent, or Firm* — Banner & Witcoff Ltd.

(57) ABSTRACT

A magnetic angular position sensor system is described herein, which includes a shaft rotatable around a rotation axis, the shaft having a soft magnetic shaft end portion. The system further includes a sensor chip spaced apart from the shaft end portion in an axial direction and defining a sensor plane, which is substantially perpendicular to the rotation axis. At least four magnetic field sensor elements are integrated in the sensor chip, with two of the magnetic field sensor elements being spaced apart from each other and are sensitive to magnetic field components in a first direction and wherein two of the magnetic field sensor elements are spaced apart from each other and are only sensitive to magnetic field components in a second direction, whereby the first and the second direction are mutually non-parallel and the first and the second direction being perpendicular to the rotation axis.

20 Claims, 12 Drawing Sheets

Related U.S. Application Data division of application No. 15/440,834, filed on Feb. 23, 2017, now Pat. No. 10,488,225.

(51) Int. Cl.
  *G01R 33/02* (2006.01)
  *G01R 33/07* (2006.01)
  *G01B 7/14* (2006.01)
  *G01B 7/30* (2006.01)
  *G01D 5/244* (2006.01)

(56) References Cited

U.S. PATENT DOCUMENTS

| | | |
|---|---|---|
| 9,267,781 B2 | 2/2016 | Ausserlechner |
| 10,102,992 B2 | 10/2018 | Werth et al. |
| 10,488,225 B2 | 11/2019 | Ausserlechner |
| 11,092,463 B2 | 8/2021 | Ausserlechner |
| 2008/0143329 A1 | 6/2008 | Ishihara |
| 2010/0176804 A1 | 7/2010 | Ausserlechner |
| 2013/0114089 A1 | 5/2013 | Jarisch et al. |
| 2015/0137796 A1* | 5/2015 | Ausserlechner ......... G01B 7/30 324/207.13 |
| 2016/0178400 A1 | 6/2016 | Vuillermet et al. |
| 2017/0248445 A1 | 8/2017 | Ausserlechner |
| 2020/0049528 A1 | 2/2020 | Ausserlechner |

FOREIGN PATENT DOCUMENTS

| | | |
|---|---|---|
| CN | 103403500 A | 11/2013 |
| CN | 103913189 A | 7/2014 |
| CN | 104655004 A | 5/2015 |
| DE | 10049351 A1 | 4/2001 |
| DE | 102014116826 A1 | 5/2015 |
| DE | 102014116842 A1 | 6/2015 |
| FR | 2776064 A1 | 9/1999 |
| JP | 2003-121200 A | 4/2003 |
| JP | 2006191738 A | 7/2006 |
| KR | 20130016975 A | 2/2013 |
| WO | WO-2009033127 A2 | 3/2009 |

OTHER PUBLICATIONS

Office Action dated Jan. 23, 2018 for Japanese Application No. 2017-033382.

Notice of Allowance dated Nov. 21, 2018 for Korean Patent Application No. 10-2017-0024063.

Office Action dated Dec. 4, 2018 for Chinese Patent Application No. 201710103244.6.

* cited by examiner (a)

(b)

MAGNETIC ANGULAR POSITION SENSOR

CROSS-REFERENCE TO RELATED APPLICATIONS

The present application is a divisional of U.S. patent application Ser. No. 16/656,912, filed on Oct. 18, 2019, which issued as U.S. Pat. No. 11,092,463 on Aug. 17, 2021, which is a divisional of U.S. patent application Ser. No. 15/440,834, filed on Feb. 23, 2017, which issued as U.S. Pat. No. 10,488,225 on Nov. 26, 2019, which claims the benefit of and priority to German patent application no. 102016103325.1, filed on Feb. 25, 2016, the contents of each of which are incorporated herein by reference in their entireties.

TECHNICAL FIELD

The invention relates in general to angular position sensors which make use of magnetic field sensors to measure an angle value, and more particularly to on-axis angular position sensors, systems and methods having a variety of applications, including in brushless direct current (DC) motors.

BACKGROUND

Magnetic field sensors can be used to sense an angle position of a shaft or other object. For example, a permanent magnet can be mounted on the shaft, and a magnetic field sensor can be arranged proximate to the magnet in order to sense a magnetic field generated by the magnet as it rotates with the shaft. When the magnetic field sensor is mounted next to the shaft at a particular distance from the axis of rotation of the shaft, the sensor is often referred to as an "off-axis" magnetic angular position sensor. Off-axis magnetic angular position sensors are often implemented when the front side of the shaft is inaccessible (e.g. due to a specific use or assembly of the shaft), and therefore sensor elements cannot be mounted on the axis of rotation. Conversely, an "on-axis" magnetic angular position sensor is mounted at or proximate to one end of the shaft facing its front side and, generally, in-line with or symmetrically to the axis of rotation. In some embodiments, on-axis magnetic field angle sensors can be designed to measure a magnetic field gradient. For this purpose, the magnetic field may be measured at two different points, which are arranged at opposing sides of and symmetrically to the axis of rotation. The gradient may then be determined in sufficient approximation for many applications by combining the two measured magnetic field values, e.g. by subtraction.

In many applications it is a general design goal for magnetic angular position sensors to be inexpensive while also being robust with respect to external magnetic fields and other disturbances and insensitive to assembly tolerances. One particular application for magnetic field angle sensors is in brushless DC (BLDC) motors for the detection of the (angular) shaft position during rotation. BLDC motors present a challenging environment for magnetic field sensors as they typically include strong rotating magnets and copper windings carrying large currents, both of which produce time-varying magnetic fields which interfere with the magnetic field used to measure angular position and thus result in a measurement error. These disturbing magnetic fields are strongly inhomogeneous, which makes it difficult to eliminate their effect on the angular position measurement. In view of these problems there is a general need for improvement in magnetic angular position sensors.

SUMMARY

A magnetic angular position sensor system is described herein. According to one exemplary embodiment the angular position sensor system comprises a shaft rotatable around a rotation axis, wherein the shaft has a soft magnetic shaft end portion. The system further comprises a sensor chip spaced apart from the shaft end portion in an axial direction and defining a sensor plane, which is substantially perpendicular to the rotation axis. At least four magnetic field sensor elements are integrated in the sensor chip, wherein two of the magnetic field sensor elements are spaced apart from each other and are only sensitive to magnetic field components in a first direction and wherein two of the magnetic field sensor elements are spaced apart from each other and are only sensitive to magnetic field components in a second direction, whereby the first and the second directions are mutually non-parallel and the first and the second directions are perpendicular to the rotation axis. Moreover, the system comprises a magnetic field source that magnetizes the shaft end portion, wherein the shaft end portion is formed such that a magnetic field in the sensor plane, which is caused by the magnetic field source, is rotationally symmetric with order N, wherein N is a finite integer number $\geq 1$. The system also comprises circuitry that is coupled to the at least four magnetic field sensor elements and configured to calculate an angular position of the shaft by combining output signals of the at least four magnetic field sensor elements.

In accordance with another exemplary embodiment, the angular position sensor system comprises a shaft rotatable around a rotation axis, wherein the shaft has a soft magnetic shaft end portion. The system further comprises a sensor chip spaced apart from the shaft end portion in an axial direction and defining a sensor plane which is substantially perpendicular to the rotation axis. At least four magnetic field sensor elements are integrated in the sensor chip, wherein a first and a second magnetic field sensor element of the magnetic field sensor elements are spaced apart from each other and are sensitive to magnetic field components in a first direction. A third and a fourth magnetic field sensor element of the magnetic field sensor elements are spaced apart from each other and are sensitive to magnetic field components in a second direction, wherein the first and the second directions are mutually non-parallel and perpendicular to the rotation axis. Moreover, the system comprises a magnetic field source that magnetizes the shaft end portion, wherein the shaft end portion is formed such that a magnetic field in the sensor plane, which is caused by the magnetic field source, is rotationally symmetric with order N, whereby N is a finite integer number $\geq 1$. The system also comprises a signal processing circuit which is coupled to the at least four magnetic field sensor elements and configured to: calculate a first signal representing the difference of the magnetic field components sensed by the first and the second magnetic field sensor elements; calculate a second signal representing the difference of the magnetic field components sensed by the third and the fourth magnetic field sensor elements; and calculate an angular position of the shaft by combining at least the first and the second signal.

Additionally, an electric motor assembly is described herein. In accordance with one exemplary embodiment the electric motor comprises a stator including at least one stator coil, a rotor including at least a shaft, which has a front side and a soft-magnetic shaft end portion, and a printed circuit board (PCB), which is arranged such that it faces the front side of the shaft. At least one sensor chip is attached to the PCB and spaced apart from the shaft end portion. At least four magnetic field sensor elements are arranged in the at least one sensor chip, wherein two of the magnetic field sensor elements are spaced apart from each other and are only sensitive to magnetic field components in a first direction and two of the magnetic field sensor elements are spaced apart from each other and are only sensitive to magnetic field components in a second direction, whereby the first and the second direction are substantially mutually non-parallel and the first and the second directions are perpendicular to the rotation axis. A magnetic field source is provided which magnetizes the shaft end portion, wherein the shaft end portion is formed such that the magnetic field components in the first and the second direction are rotationally symmetric with order N and N is a finite integer number ≥1. An evaluation circuit is coupled to the at least four magnetic field sensor elements and configured to calculate an angular position of the shaft by combining at least four output signals of the at least four magnetic field sensor elements. Moreover, power electronic circuitry is arranged on the PCB and coupled to the stator coils and configured to supply an operating current to the stator coils.

Furthermore, a method for measuring an angular positon of a shaft which includes a soft magnetic shaft end portion is described herein. In accordance with one exemplary embodiment, the method includes magnetizing the shaft end portion, wherein the shaft end portion is formed such that the magnetic field components in a first and a second direction in a sensor plane, which is substantially perpendicular to a rotation axis of the shaft, are rotationally symmetric with order N, whereby N is a finite integer number ≥1. The method further includes sensing magnetic field components in the first direction at at least a first and a second location in the sensor plane, wherein the second location is different from the first location, as well as sensing magnetic field components in the second direction at at least a third and a fourth location in the sensor plane, wherein the fourth location is different from the third location. Moreover, the method includes calculating an angular position of the shaft with respect to its rotation axis based on the difference of the magnetic field components at the first and the second location and on the difference of the magnetic field components at the third and the fourth location.

BRIEF DESCRIPTION OF THE DRAWINGS

The invention can be better understood with reference to the following description and drawings. The components in the figures are not necessarily to scale, emphasis instead being placed upon illustrating the principles of the invention. Moreover, in the figures, like reference numerals designate corresponding parts. In the drawings.

DETAILED DESCRIPTION

The embodiments described herein relate to magnetic field sensors used in magnetic angular position sensors with on-axis arrangements of sensor elements relative to a rotation axis of a magnet or a shaft. In one embodiment, a magnetic angular position sensor is mounted in an on-axis configuration relative to a rotatable shaft. The shaft comprises an end portion that may be composed of a soft magnetic material or a permanent magnet. The end portion of the shaft may have a front surface facing the sensor and be rotationally asymmetric with respect to a rotation axis of the shaft. The sensor comprises at least three magnetic field sensor elements arranged in a plane generally perpendicular to the rotation axis. Circuitry coupled to the magnetic field sensor elements is configured to estimate a rotational position of the shaft by combining the signals of the at least three magnetic field sensor elements. While numerous applications exist for various embodiments of the sensor, some embodiments may, among other applications, be particularly suitable for use in or with BLDC motors. Any particular references to directions made herein (i.e., downward, upward, right, left, etc.) are merely used for reference to a specific drawing and are not are limiting with regard to the claims.

Figure 1:
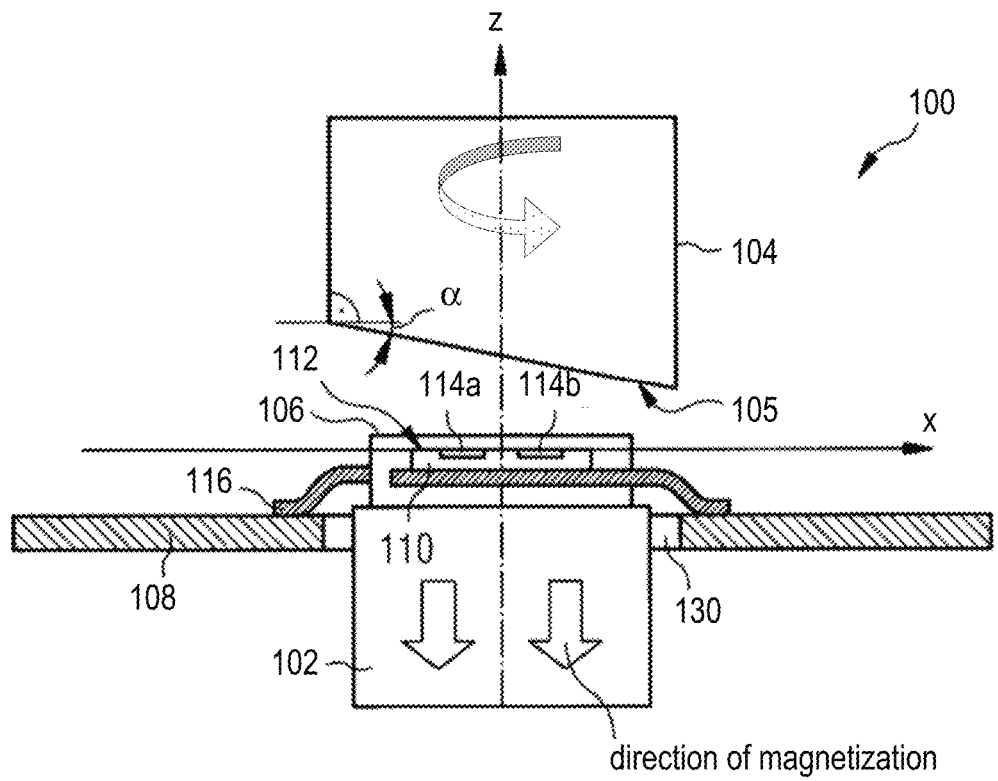
FIG. 1 is a sectional view illustrating a longitudinal section of an on-axis angular position sensor.

An example of an on-axis angular position sensor system 100 is illustrated in FIG. 1. The sensor system 100 includes a magnetic field source, such as a permanent magnet 102, and a sensor package 106, which is arranged on a printed circuit board (PCB) 108. The sensor package 106 is—at least—partially arranged between the permanent magnet 102 and an end portion of a shaft 104, which is configured to rotate around a rotation axis. In FIG. 1, the rotation axis is defined as the z-axis of a Cartesian coordinate system, and the x-y-plane is perpendicular to the rotation axis.

In some embodiments, the permanent magnet 102 comprises a ferrite magnet. Ferrite magnets can be less expensive than other types of magnets (e.g., rare-earth magnets) and contribute to lower overall system costs. However, in other embodiments rare earth magnets or other types of magnets can be used. In some embodiments, the magnet 102 can even be omitted. In this case the end portion of the shaft 104 has a significant remanent magnetization. For example, the magnet 102 may comprise an Sr-ferrite, a Ba-ferrite, or some other ferrite, AlNiCo, a rare-earth material such as NdFeB or SmCo, or some other suitable material. Generally, the magnet 102 comprises a material having a remanent magnetization of at least about 100 mT and sufficient coercivity to ensure stability of magnet 102.

In the example depicted in FIG. 1, the magnet 102 is magnetized in an axial direction (see arrows in FIG. 1). That is, the orientation of magnetization of the magnet 102 is generally parallel to the rotation axis of shaft 104 (z-axis). In other embodiments, the magnet 102 may be magnetized in a radial direction. However, the magnet 102 is usually (but not necessarily) rotationally symmetric (i.e., has both geometric and magnetic symmetry such that the geometry and magnetization do not depend on the angular position relative to the rotation axis). For example, the magnet 102 may have a cylindrical shape as shown in the embodiment of FIG. 1. However, other shapes and directions of magnetization may be used in other embodiments. In general, however, the magnet 102 has rotational symmetry and, during operation, provides a magnetic field which is rotationally symmetric with regard to the rotation axis. The non-rotationally symmetric geometry of the end portion of the shaft 104, however, interrupts this rotational symmetry. Due to the resulting asymmetry, the angular position of the shaft 104 can be detected by the angular position sensor.

As shown in FIG. 1, the shaft 104 comprises an end portion with a front side (surface 105), which is arranged opposite to the sensor package 106. As mentioned, the shaft 104 is generally arranged rotationally symmetric, whereas the front side 105 of the shaft 104 may be asymmetrical with respect to the rotation axis. In the example of FIG. 1, the front side 105 is tilted by an angle α with respect to the xy-plane. In one embodiment, the angle α is about 15 degrees, though it can be larger or smaller in other embodiments. Theoretically the angle α can be between 0 degrees and 90 degrees, in practical implementations α can be, for example, between about 5 degrees and about 25 degrees. Due to the fact that α is greater than 0 degrees, the size of the air gap (in the z-direction) generally depends, at a specific position in the xy-plane, on the angular position of the shaft 104.

In some embodiments, the shaft 104 comprises ferrous material, such as a soft magnetic material, like iron or mild steel, with a relative permeability $\mu_R$ in the range of about 1,600 (steel) to 4,000 (iron). Generally, shaft 104 may comprise a ferrous material with a relative permeability greater than about 100 or greater than about 1,000. In some embodiments, only an end portion of the shaft comprises magnetic material, whereas the rest of the shaft 104 is mainly made of a non-magnetic material such as a non-iron alloy, a non-magnetic or low-magnetic steel, or other materials.

As shown in FIG. 1, the sensor package 106 is generally arranged between the permanent magnet 102 and the front side 105 of the shaft 104. The xy-plane is defined as the plane in which the magnetic field sensor elements 114a, 114b are arranged within the chip package. Therefore the axial distance between the xy-plane and the front side 105 of the shaft 104 is the effective air gap of the magnetic circuit. The sensor package 106 may be arranged substantially in-line with the rotation axis and, thus, forms an on-axis sensor arrangement. The sensor package 106 includes at least one semiconductor die 110 in which the magnetic field sensor elements 114a, 114b are integrated. The semiconductor die 110 is generally perpendicular to the rotation axis (z-axis) and comprises a primary surface 112, which is the sensitive plane (i.e. the xy-plane) of the sensor elements 11a and 114b. Only two sensor elements 114a and 114b are visible in the cross-sectional view of FIG. 1. However, the angular position sensor includes at least three sensor elements, in some configurations at least four sensor elements. In both cases, the sensor elements are mutually spaced apart from each other, and each sensor element provides a separate sensor signal that represents the magnetic field component at the location of the respective sensor element and in the sensitive direction of the respective sensor element.

In some embodiments, the package 106 is a surface-mounted device (SMD), in which the semiconductor die 110 is attached to a leadframe 116. The leadframe 116 comprises pins, which are soldered to the PCB 108. In the embodiment of FIG. 1, the permanent magnet 102 is arranged at least partially within an opening 130 in the PCB 108, such that permanent magnet 102 can touch a backside of the package 106. However, the opening is not needed in other embodiments in which the permanent magnet 102 can be mounted under the PCB 108. For example, in one embodiment, the permanent magnet 102 is mounted to the backside of PCB 108. In this context the backside of the package is the side which is opposite to the front side, and the front side of the package 106 is the side which faces the front side 105 of the shaft. It should be noted that the set-up of the angular position sensor may be different from the example shown in FIG. 1 in other embodiments. For example, a bare die could be mounted to a PCB instead of using a chip package. In other embodiments, the sensor elements 114a and 114b may be arranged in separate semiconductor dies in one or more chip packages. In some embodiments the permanent magnet 102 may be attached to the bottom side of the PCB 108 or integrated in the sensor package 106.

The sensor elements 114 (collectively for 114a and 114b) may either be sensitive to magnetic field components in an axial direction or to magnetic field components in a radial direction. In various embodiments, the sensor elements 114 may comprise magneto-resistive (MR) sensor elements (e.g., AMR, GMR, TMR, CMR and others), giant magneto-impedance (GMI) sensor elements, Hall-effect sensor elements (e.g., vertical Hall sensor elements), MAGFETs, and other magnetic field sensor elements and combinations thereof which are suitable to sense magnetic field components in a plane that is perpendicular to the rotation axis of the shaft whose angular position is to be measured. In various embodiments, the sensor elements 114 are oriented such that they are either sensitive to a magnetic field component in an x-direction or in an y-direction, wherein the rotation axis of the shaft is defined as extending along a z-direction. the x-, y- and z-directions form a Cartesian coordinate system.

Generally, the sensor set-ups described herein can be used in brushless DC (BLDC) motors. Such BLDC motors employ permanent magnets to magnetize the rotor (armature) of the BLDC motor, whereas stator windings are used to form coils to magnetize the stator of the BLDC motor. Current pulses are applied to the stator coils, wherein the current pattern is designed to achieve a desired torque and/or rotation of the rotor. To allow a compact design of the BLDC motor, on-axis angular position sensors are used, wherein the printed circuit board (PCB) carrying the power electronics generating the mentioned current pattern usually also carries the components of the angular position sensor. Exemplary embodiments showing the application of an on-axis angular position sensor in BLDC motors are shown later in FIGS. 15 and 16.

Figure 2:
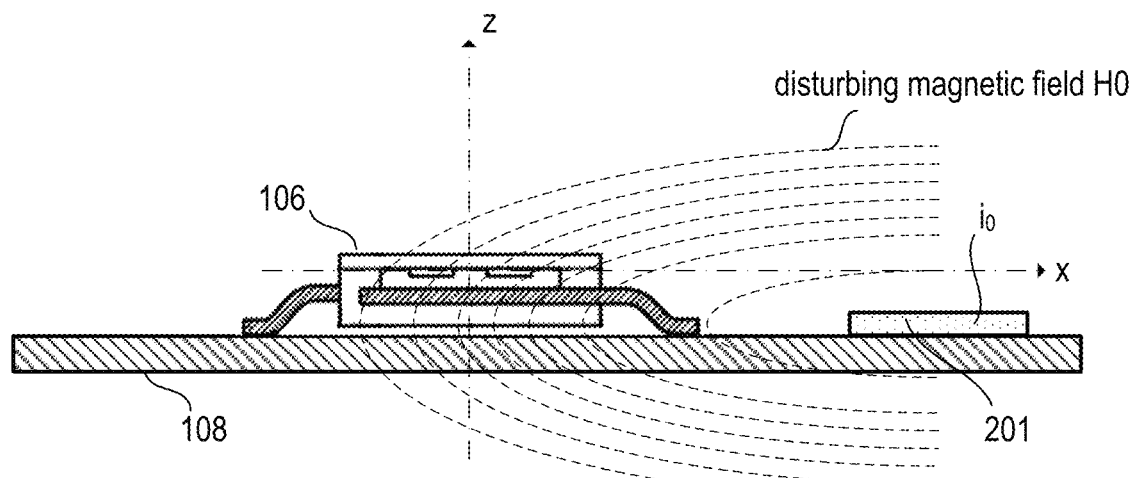
FIG. 2 illustrates disturbing magnetic field due to high currents on the PCB.

FIG. 2 illustrates how disturbing magnetic fields can affect the field measurement by the magnetic field sensor elements 114. In the example of FIG. 2 only the sensor package 106 is shown together with a current-carrying element 201 (e.g. a strip line or a power semiconductor device) mounted on the PCB 108. The current $i_0$ passes through element 201 substantially parallel to the y-axis, thus generating magnetic field $H_0$ illustrated by the magnetic field lines in FIG. 1. As can be seen from the field lines, the magnetic field $H_0$ comprises a significant component $H_{0,z}$ in z-direction at the location of the magnetic field sensor elements which is highly inhomogeneous. This magnetic field component $H_{0,z}$ may superpose with the magnetic field of the permanent magnet 102 (not shown in FIG. 2) and cause a measurement error when determining the angular position from the sensor signals. In practice, the magnetic field components $H_{0,x}$ and $H_{0,y}$ perpendicular to the z-axis (in the xy-plane) have a significantly smaller magnitude at the location of the magnetic field sensor elements. To minimize the effect of disturbing magnetic fields, which are generated by currents generated by power electronic devices on the PCB 108, magnetic field sensor elements 114 are used which are only sensitive to magnetic field components in the x- or y-direction and are substantially insensitive to magnetic field components in the z-direction (axial direction). Moreover, pairs of sensor elements are used to implement a differential measurement as will be explained further below (see FIGS. 11-13). The differential measurement is used to implement a kind of gradiometer, which senses the spatial gradient of the measured magnetic field components and thus eliminates the effect of homogeneous disturbing magnetic fields (generated externally of the PCB 108 or the BLDC motor). Combining the use of magnetic field sensors which are substantially insensitive in an axial (i.e. z-) direction with a differential measurement principle allows for an angular position measurement which is robust against disturbing magnetic fields generated on board (i.e. by the power electronics on the PCB 108) as well as off board (i.e. substantially homogeneous external magnetic fields).

Figure 3:
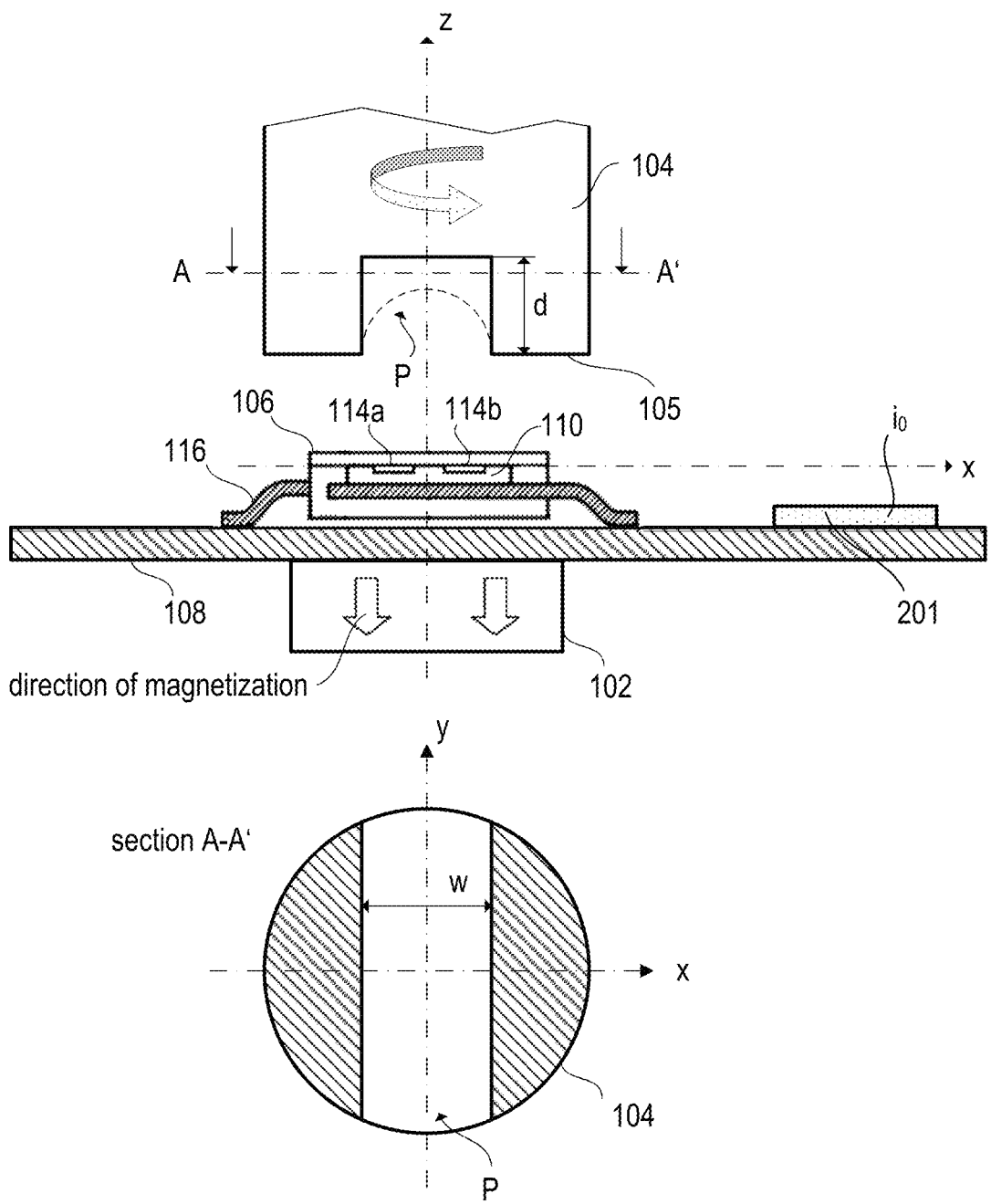
FIG. 3 illustrates a longitudinal section of an on-axis angular position sensor arrangement in accordance with one embodiment and a cross-section through a shaft rotating about the axis.

In the embodiments described herein the end portion of the shaft 104 has a rotational symmetry of a specific order, wherein rotational symmetry of order N (also called N-fold rotational symmetry) means that each rotation by an angle of 360°/N does not change the object. N is a finite (non-zero and non-infinite) integer number equal to or greater than 1. It is noted that a symmetry of order 1 is actually not a symmetry, as only a full rotation by 360° of the shaft yields an unchanged geometry. In contrast, a symmetry of order 2 means that a rotation of 180° of the shaft yields an unchanged geometry. Similarly, a symmetry of order 3 means that a rotation of 120° of the shaft yields an unchanged geometry. In the example of FIG. 3, the end portion of the shaft 104 has a recess P (groove) in its front side. The recess P has the shape of a slit running straight (e.g. along the y-direction) through the rotation axis, which results in a shaft end portion having a symmetry of order 2 (see section A-A' in FIG. 3). Except for the end portion of the shaft 104, the set-up of the angular position sensor arrangement shown in FIG. 3 is almost identical with the example of FIG. 1. The permanent magnet 102, however, is mounted on the back-side of the printed circuit board (PCB) 108 instead of being arranged at the back-side of the sensor package 106 through an opening in the PCB 108 as shown in FIG. 1. The sensor package 106 is mounted on the front side of the PCB 108 and includes at least one semiconductor chip 110, which has several magnetic field sensor elements 114a, 114b integrated in the chip 110. All magnetic field sensor elements are sensitive to a magnetic field component in the xy-plane and insensitive to a magnetic field component in the z-direction (i.e. axial direction).

In an alternative embodiment, which is illustrated by the curved dashed line in FIG. 3 (and also in FIG. 6 discussed further below), the groove P has the shape of a half-cylinder (half-circular cross section) instead of a rectangular cross-section. Both embodiments have been simulated. In both embodiments the sensor chip 110 is arranged in the xy-plane at z=0, and the sensitive magnetic field sensor elements are at z=0.1 mm. The rotation axis is defined as x=y=0. In the first embodiment, the permanent magnet has a diameter of 10 mm, is arranged coaxially to the shaft 104, and has an axial length of 5 mm (from z=−6.5 mm to z=−1.5 mm). The remanent magnetization of the permanent magnet 102 is 1 Tesla; its relative permeability $\mu_R$ is 1.1. The diameter of the shaft 104 is 6 mm, and the front side of the shaft 104 is at z=1 mm. The air gap between shaft and permanent magnet is thus 2.5 mm. The relative permeability $\mu_R$ of the shaft 104 is 1700. The width w of the groove is 2 mm and its depth is 3 mm (rectangular cross-section). With the data above, the magnetic field components $H_X$, $H_Y$ within the xy-plane (i.e. in the sensor plane, in which the sensor elements extend) can be approximated (using linear regression in the simulated magnetic field data) as $H_X=a \cdot x/\mu_0$ with a=56.6 T/m and $H_Y=b \cdot x/\mu_0$ with b=10 T/m, wherein $\mu_0$ is the vacuum permeability. In the second embodiment, the diameter of the permanent magnet is 4 mm, its remanent magnetization is 1 T (magnetized parallel to the z-axis), and its axial length is 4 mm (from z=−4.2 mm to −0.2 mm). The shaft has a diameter of 6 mm and the groove P is a half-cylinder with radio of 1.5 mm. The front side of the shaft is at z=1.8 mm so the air gap is 2 mm. Different to the first embodiment, the groove P is filled with another permanent magnet 102' (like in the example of FIG. 6) having a magnetization of −1 T (magnetized parallel to the z-axis). The magnetic field sensor elements are at z=0.5 mm. In this arrangement, the magnetic field components in the x- and y-direction of the two permanent magnets constructively superpose. The simulation yields an approximation of $H_X=a \cdot x/\mu_0$ with a=175.4 T/m and $H_Y=b \cdot x/\mu_0$ with b=102.2 T/m. As such, the second magnet 102' makes the diametrical magnetic field components (x-, y-components) stronger and the axial magnetic field component (z-component) smaller. In an ideal implementation the two magnets should be balanced to make axial magnetic field on the sensor elements vanish, because then small tilts of the sensor plane (xy-plane) with respect to the rotation axis—which are inevitable due to assembly tolerances—have the smallest possible effect on the accuracy of angular position measurement.

As mentioned above, the groove P may be filled with a second permanent magnet 102'. Generally, one permanent magnet is attached to the shaft 104 (e.g. in the groove P) so that it rotates synchronously with the shaft 104 and the other permanent magnet (cf. permanent magnet 102 in FIG. 3) one is attached to the sensor package 106 (cf. FIG. 1) or the PCB 108 (cf. FIG. 3) so that it does not rotate. Both permanent magnets are magnetized in a direction parallel to the rotation axis (z-direction), wherein one of the permanent magnets is magnetized in positive z-direction, the other in the negative z-direction. This way their magnetic field contributions $H_X$, $H_Y$ in the xy-plane add up. One of the two permanent magnets may be omitted and the sensor arrangement would still be functional. Whether one or two magnets are used may depend on available space, costs, stray field robustness of the surrounding electronic components, etc.

Different magnetic materials may be used for the two permanent magnets. The rotating permanent magnet can be made of, for example, injection molded magnet material, in which magnetic grains are embedded in a polymer matrix, whereas the non-rotating permanent magnet (permanent magnet 102) may be a sintered magnet which cannot be easily manufactured for complex geometries. However, sintered magnets can have a very high remanent magnetization (in case of NdFeB material the remanence can exceed 1 T). In contrast thereto, plastic bonded or injection molded magnets have a lower remanent magnetization (in the case of NdFeB plastic bonded magnets the remanent magnetization may be up to only 0.6 T).

Figure 4:
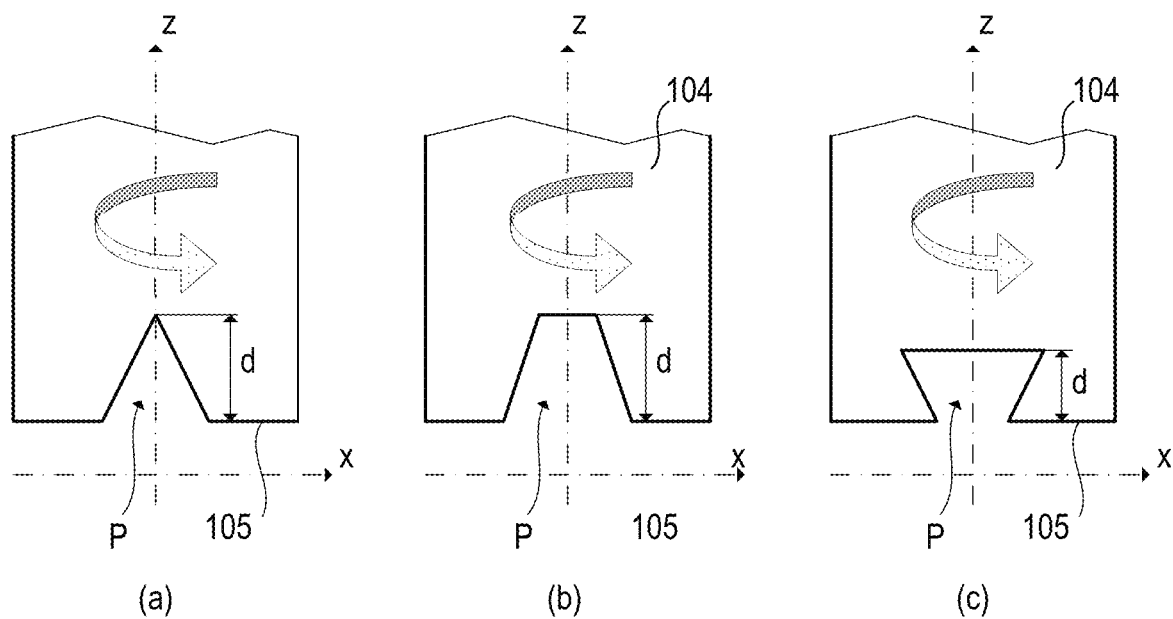
FIG. 4 illustrates three different examples of shaft end-portions to be used in an on-axis angular position sensor.

In one specific embodiment the sensor chip 110, in which the magnetic field sensor elements are integrated, has a size of about 0.5 mm to 4 mm, e.g. 1.5 mm, in the x-direction. Therefore the spacing of the magnetic field sensor elements is also in this range (see also FIGS. 11-13). The width w (along the x-direction) of the groove P in the end-portion of the shaft 104 may have a similar size or be slightly larger than the chip 110, e.g. 2 mm. The shaft diameter may range from approximately twice the width of the groove P (e.g. 4 mm) to—theoretically—arbitrarily large diameters. The depth d of the groove (i.e. the axial length along the z-direction) may exceed half of the width of the groove (i.e. more than 1 mm) and be e.g. the same as its width. In the latter case, the cross section (perpendicular to the y-axis in the example of FIG. 3) of the groove is quadratic. Deeper grooves are possible. However, deeper grooves do not result in a magnetic behavior that is significantly different from the magnetic behavior of grooves having a depth that is equal to their width. FIG. 4 illustrates three other examples of shaft end-portions, which have different grooves P. In all three examples (FIGS. 4a, 4b, and 4c) the groove extends straightly through the rotation axis of the shaft end-portion. The example in FIG. 4a has a groove P with a V-shaped cross section, the example of FIG. 4b has a grove P with a trapezoidal cross section, wherein the cross section becomes narrower with increasing depth, and the example of FIG. 4c has a grove P with a trapezoidal cross section, wherein the cross section becomes wider with increasing depth.

Figure 5:
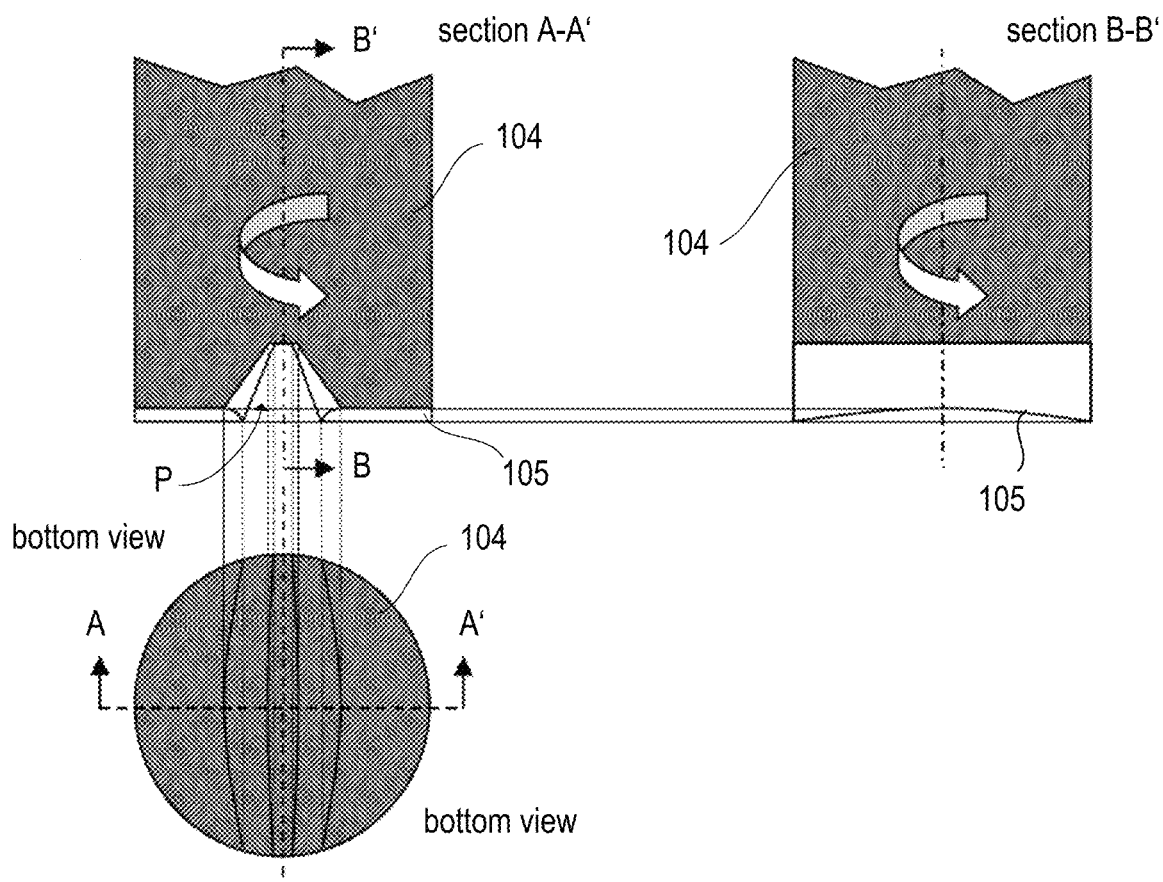
FIG. 5 illustrates another example of a shaft end-portion to be used in an on-axis angular position sensor.

Moreover, the groove P does not necessarily have a constant depth d. The depth d of the groove P may be greater towards the rotation axis and lower towards the perimeter of the shaft. Also the front-face (the surface of the front side) of the end-portion is not necessarily a flat plane. In the example of FIG. 5 the front-face has a curvature. For example, the front surface may be part of a spherical surfaces, whose spherical center lies on the rotation axis. Alternatively, the front surface may be part of a cylindrical surface whose cylinder axis may intersect the rotation axis at 90°. Such curvatures may help to "design" the magnetic field in a way that the signal level of the output signals of the magnetic field sensor elements is maximized (or, in case of a differential measurement, that the difference of two respective output signals of a pair of magnetic field sensor elements is maximized). FIG. 5 illustrates two different longitudinal sections (section A-A' and section B-B') and a bottom view of the same shaft end portion.

Generally, a shaft end-portion with N-fold rotational symmetry allows to measure an absolute angular position within the interval [0, 360°/N]. The shaft 104 is that component of the sensor arrangement which generally is machined most accurately as compared with other components. In contrast thereto, the permanent magnet 102 may be machined significantly less accurately than the shaft 104. Neither the shape of the permanent magnet 102, nor its material homogeneity, nor its magnetization (with regard to magnitude, direction, and homogeneity), and its stability over time and temperature are well defined. However, in the embodiments described herein the permanent magnet 102 is used only to magnetize the shaft end-portion and does not rotate. In other words, the permanent magnet 102 does not define the angular position of the magnetic field; it only biases the shaft end-portion, which defines the angular position of the magnetic field. Therefore small inaccuracies (with regard to geometry and magnetization) of the permanent magnet 102 do not have a significant impact on the accuracy of the angular position measurement. As, for the reasons mentioned above, the permanent magnet 102 does not need to have a precise and complex shape and magnetization, a cost-effective sintered magnet may be used. Sintered rare-earth magnets may have a high remanent magnetization of more than 1 T, which results in comparably strong magnetic fields through the sensor elements and therefore increases robustness against noise and interference (i.e. the magnetic signal-to-noise ratio is high). Moreover, since the permanent magnet 102 does not rotate, it does not produce large rotating magnetic fields which could disturb other electronic components. The shaft end-portion may be arranged very closely to the sensor chip 110 and thus to magnetic field sensor elements (e.g., 1 mm air gap spacing or even less, depending on the axial tolerance of the shaft). Thus the distance between relevant magnetized portions of the shaft end-portion and sensor elements can be comparably small, which also increases the magnitude of the measured magnetic field components.

In the embodiments described above, the shaft end portion has a rotational symmetry of order 2 (two-fold rotational symmetry) which allows for an unambiguous angular position measurement in the range between 0 and 180°. Due to the symmetry, the sensor arrangement cannot distinguish between an angle φ and an angle φ+180°. However, an unambiguous angular position measurement within the full range from 0° to 360° is not necessary in many applications such as in brushless DC (BLDC) motors.

Figure 6:
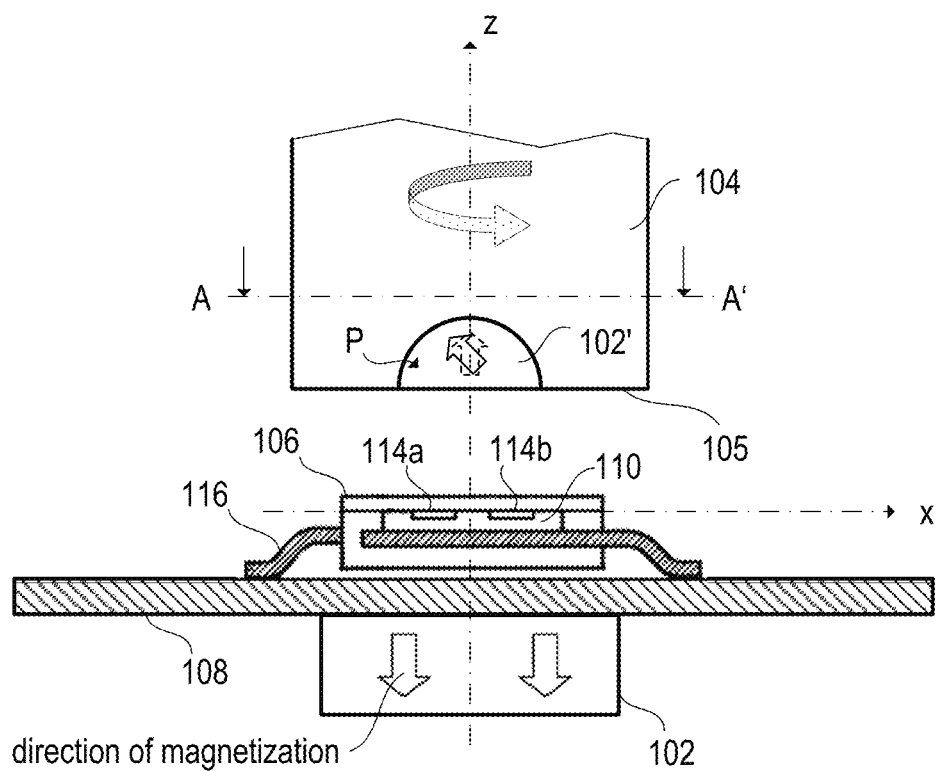
FIG. 6 illustrates a longitudinal section of an on-axis angular position sensor arrangement in accordance with another embodiment, wherein the groove in the shaft end-portion is filled with a permanent magnet.

However, if an unambiguous angular position measurement is desired throughout the full range between 0° and 360°, the orientation of the remanent magnetization of the rotating permanent magnet 102' may be tilted with respect to the rotation axis (z-axis) as shown in the example of FIG. 6. This means that—in addition to its magnetization in z-direction (i.e. parallel to the rotation axis) the rotatable magnet should also have a certain (preferably small) amount of magnetization perpendicular to the z-direction (i.e. along x- or y-directions or any other diametrical direction). In FIG. 6 the dashed-line arrow in permanent magnet 102' indicates the previously explained remanent magnetization antiparallel to the z-direction, whereas the solid-line arrow indicates the above-mentioned tilted magnetization.

In accordance with one embodiment, the rotating permanent magnet has, e.g., 80% of its magnetization along the z-direction and 20% along the x-direction (of any other diametrical direction like, e.g. the y-direction), which entails a tilt of 14° with respect to the rotation axis and would contribute a small magnetic field $H_x$, which is essentially homogeneous throughout a sensor chip. The sensor system can thus discriminate between an angle φ and an angle φ+180° by evaluating the sum and the difference of the sensor signals of different magnetic field sensor elements (see FIG. 6, magnetic field sensor elements 114a and 114b), which are spaced apart within the sensor plane (xy-plane) and sensitive to magnetic field components orthogonal to the rotation axis and insensitive to axial magnetic field components. The differential signal (e.g. $H_X(x=x_1, y=0)-H_X(x=-x_1, y=0)$) obtained from a pair of magnetic field sensor elements may be used to determine an exact angular position which is either in the range from 0 to 180° or in the range from 180° to 360°. This differential signal is a result of the magnetic effect of the groove and from axial magnetization of both magnets. The sum signal (e.g. $H_X(x=x_1, y=0)+H_X(x=-x_1, y=0)$) obtained from the pair of magnetic field sensor element can be used to determine which of the two ranges the angle φ is in (i.e. whether or not to add 180° to the previously determined angle φ). This sum signal is a result of the diametrical magnetization of the rotatable magnet. Except for the shape of the groove P and the further permanent magnet 102' arranged in the groove, the example of FIG. 6 is identical with the example of FIG. 3.

In one further embodiment, the remanent magnetization of the rotating permanent magnet 102' is oriented parallel to the x-axis (or any other diametrical direction, e.g. the y-direction), which entails a tilt (which was 14° in the previous example) of 90°. However, the non-rotating permanent magnet 102 is still magnetized parallel to the z-axis (and thus produces a rotation symmetric magnetic field). The remanent magnetization of the permanent magnet 102' should be strong enough that the resulting homogeneous diametrical field component is stronger than any potentially disturbing external magnetic field component in this direction. As the diametrical field component is only used to distinguish the 0°-180° sector from the 180°-360° sector, there are no specific requirements as to the precision of the magnetization.

In another example, the shaft end-portion is shaped rotationally asymmetric, that is it is shaped to have a rotational symmetry of order 1 so that measurement over the full range from 0° to 360° is possible even if the permanent magnets are magnetized only along the z-direction. Using this approach, the groove P could be shifted from the center towards the perimeter of the shaft end portion. Alternatively, a shaft end-portion as shown in FIG. 1 could be used. Moreover, the depth of the groove P could vary in a rotationally asymmetric manner.

Figure 7:
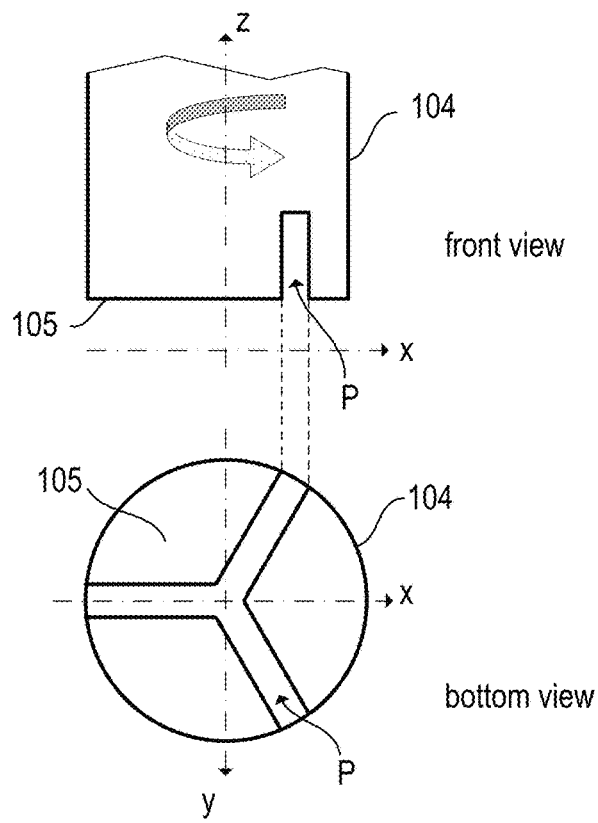
FIG. 7 illustrates an example of a shaft end-portion which has a rotational symmetry of order 3.

In the example of FIG. 7 the shaft end-portion is shaped to have a rotation symmetry of order 3. That is, an unambiguous angular position measurement is possible within the sector from 0° to 120° (360°/3). As can be seen in the bottom view shown in FIG. 7, the groove P splits up at the center of the shaft into two branches so as to form a Y-shape. Generally, the shaft 104 and the end-portion having a symmetry of order N may be one piece. However, in some embodiments the shaft end-portion is a separate part, which is attached to the shaft 104, e.g. by clamping, gluing, press-fit, etc.

Figure 8:
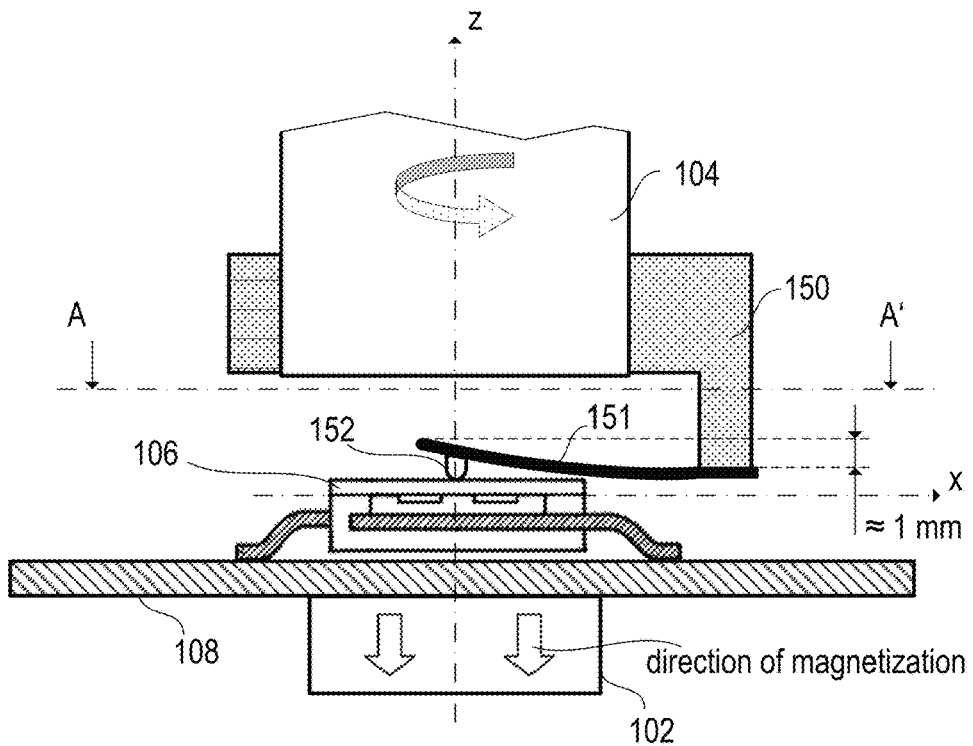
FIG. 8 illustrates a longitudinal section through a further embodiment of an angular position sensor arrangement with a flexible spring of magnetic material.

In the examples shown in FIGS. 8 to 11 the shaft end portion is or includes a flexible (elastically deformable) part 151, which is attached to the shaft 104 and thus rotates synchronously with the shaft 104. The flexible part 151 of the shaft end-portion can be designed such that it compensates for an axial play or axial tolerances of the shaft 104. In the embodiment shown in FIG. 8 the flexible part 151 is a flat spring, which is attached to the shaft 104 by an anchor element 150. In an unbent state the flat spring 151 is substantially plane, perpendicular to the rotation axis, and arranged in front of a front side of the shaft 104. The rotation axis of the shaft 104 intersects with a longitudinal axis of the flat spring. In the examples shown in FIGS. 8 and 9, the longitudinal axis of the flat spring is parallel to the x-axis, and generally the longitudinal axis of the flat spring extends radially and intersects the rotation axis. In general FIG. 8 illustrates a longitudinal section along the z-axis and is essentially identical with the examples shown in FIGS. 3 and 6, except that the shaft end-portion is composed of the flat spring 151, the mentioned anchor element 150 and a spacer 152, which is arranged between the sensor package 106 and the flat spring 152.

In one embodiment, the shaft exhibits an axial play of about +/−1 mm, and the flat spring 151 bends more or less in order to maintain a mechanical contact with the sensor package 106 via the spacer 152. The anchor element 150 may be configured to fix the flat spring 151 to the rotating shaft 104 such that the flat spring is flexible along an axial direction (z-direction) but comparably stiff in lateral (i.e. x-y-) directions. The flat spring 151 may be made of or include a soft magnetic material (e.g. spring steel), so that it takes over the magnetic function of the groove P shown in the previous embodiments (See. FIGS. 1 and 3). Alternatively, the flat spring 151 may be composed of a non-magnetic spring body (e.g. made of beryllium bronze or copper beryllium) and a soft magnetic element attached to the non-magnetic spring body. The purpose of the flexible element is that, regardless of small axial position changes of the shaft, the flexible element ensures that a soft magnetic part, which is not rotationally symmetric, is kept at a substantially constant axial distance to the sensor elements. This not rotationally symmetric soft magnetic part may be the spring itself (as in FIGS. 8-11) or any other soft magnetic part attached to the flexible end of the spring (not shown). Since the axial spacing between the soft magnetic part and the sensor elements is kept substantially constant, axial play of the shaft may have less effects on the angular position measurement and it should result in smaller errors in the measured angular position value.

In the embodiment shown in FIG. 8, small spacer 152 is attached to the flat spring 151 at the rotation axis. Thus the spacer 152 can rotate around the rotation axis synchronously with the shaft 104, whereby the spacer defines the mechanical contact point between shaft end-portion and sensor package 106 and the axial distance between the flexible shaft end-portion and the sensor package 106. The spacer 152 can be made of e.g. Teflon (polytetrafluoroethylene, PTFE) or some other kind of material that ensures low friction between spacer 152 and the sensor package 106. Generally, the sensor packages 106 includes a mold compound, which contains an abrasive filler. Thus, low friction may be a target when choosing the material for the spacer. The spacer may be magnetic or not; due to its rotational symmetry the spacer would not give rise to any magnetic field that varies dependent on the angular position.

Figure 9:
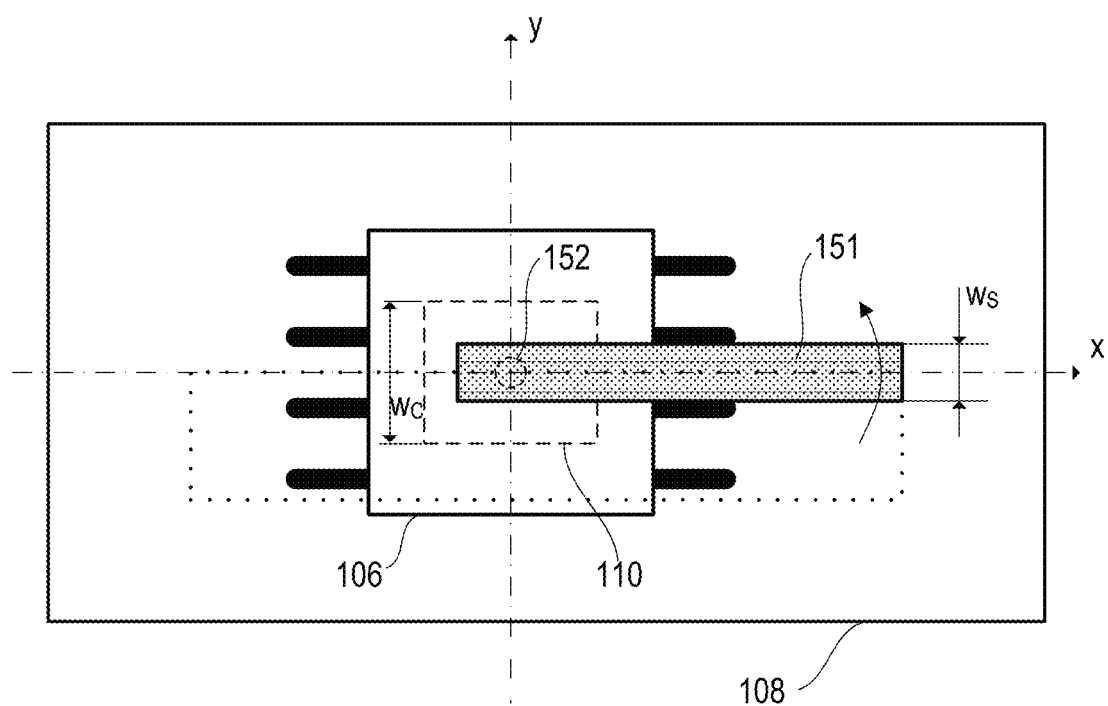
FIG. 9 illustrates—in a top view on the circuit board carrying a magnetic field sensor—two exemplary implementations of the flexible spring shown in FIG. 7.
Figure 9:
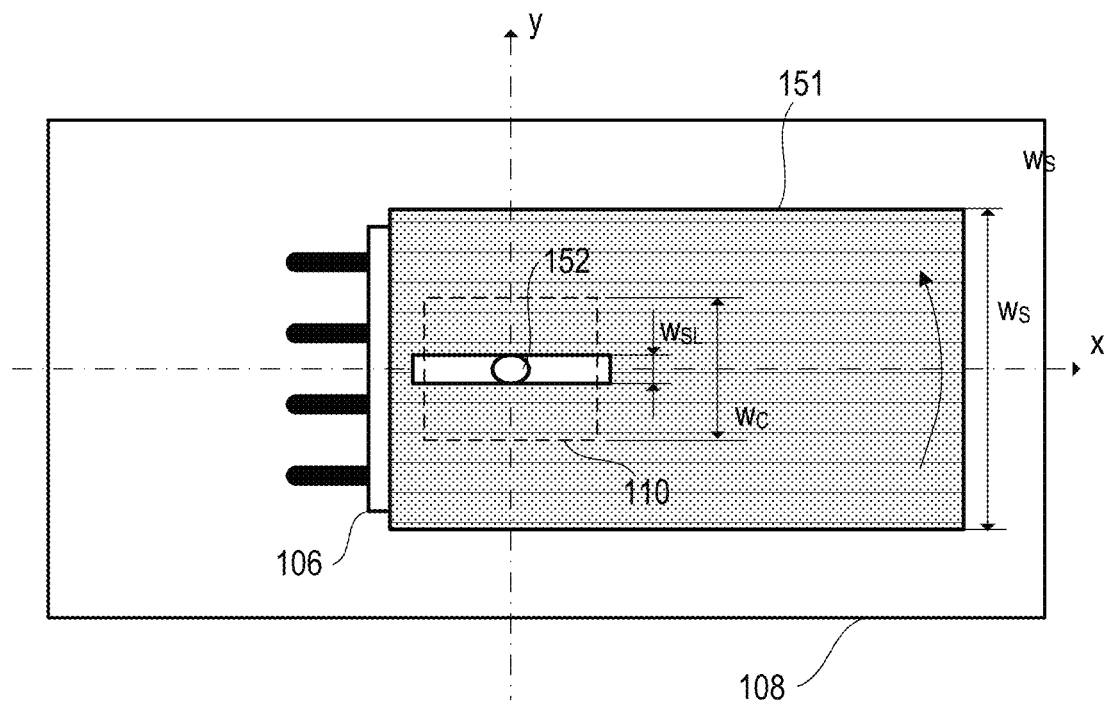

The flexible part of the shaft end portion (e.g. the flat spring) may have various shapes. Two exemplary embodiments of the flat spring 151 are shown in FIGS. 9a and 9b, both of which are a top view onto the flat spring corresponding to the sectional view of FIG. 8. In the embodiment shown in FIG. 9a the flat spring 151 has the shape of a small strip-like plate with a width $w_S$ smaller than the sensor chip 110 (width $w_C$) in the xy-plane, so that the flat spring 151 covers only a part of the sensor chip 110 (see top view of FIG. 9a). In the alternative embodiment of FIG. 9b, the width $w_S$ of the flat spring 151 is greater than the sensor chip 110 and thus covers the whole sensor chip. A slot is formed in the center of the flat spring 151 along its longitudinal axis (x-axis in FIG. 9b) so that the rotation axis runs through the slot. The width $w_{SL}$ of the slot may be smaller than the width $w_C$ of the chip (as it is the case in the example of FIG. 9b). In this embodiment the effect of the slot on the resulting magnetic field "seen" by the magnetic field sensor elements in the sensor chip 110 is very similar to the effect of the groove P used in the examples illustrated in FIGS. 3 and 6. Thus, in the present embodiment shown in FIGS. 8 and 9 the shaft end portion has a symmetry of order 2 (N=2, two-fold rotational symmetry) for angular position measurement within the range from 0° to 180°. In another embodiment the flat spring 151 has a tapered geometry (i.e. its width being smaller at one and as compared with the other end) to achieve a symmetry of order 1 and allow for an angular position measurement within the range from 0° to 360°. Moreover, the strip-like plate 151 (i.e. the spring) in FIG. 9a may be wider and longer and shifted in negative y-direction such that the upper edge of the spring is at y=0 and the spring 151 covers the part of the chip, for which y<0 (see dotted area in FIG. 9a). If this spring is ferromagnetic (i.e. soft magnetic) and magnetized by a permanent magnet 102 fixed to the sensor package or the PCB 108 or by a permanent magnet 102' fixed to the shaft, and if these magnets are rotationally symmetry with a rotationally symmetric remanent magnetization, then the spring 151 creates—at the position of the magnetic field elements—a magnetic field with symmetry of order N=1, i.e. its magnetic field on the sensor elements allows for unambiguous measurement of angles in a range from 0° to 360°. The same is true for a wide strip in FIG. 9b, if the width $w_{SL}$ of the slot is wide enough (e.g. wider than $w_C/2$) and long enough (e.g. longer than the chip) and if the slot is shifted towards a negative y-direction such that its upper edge is aligned with the x-axis.

Figure 10:
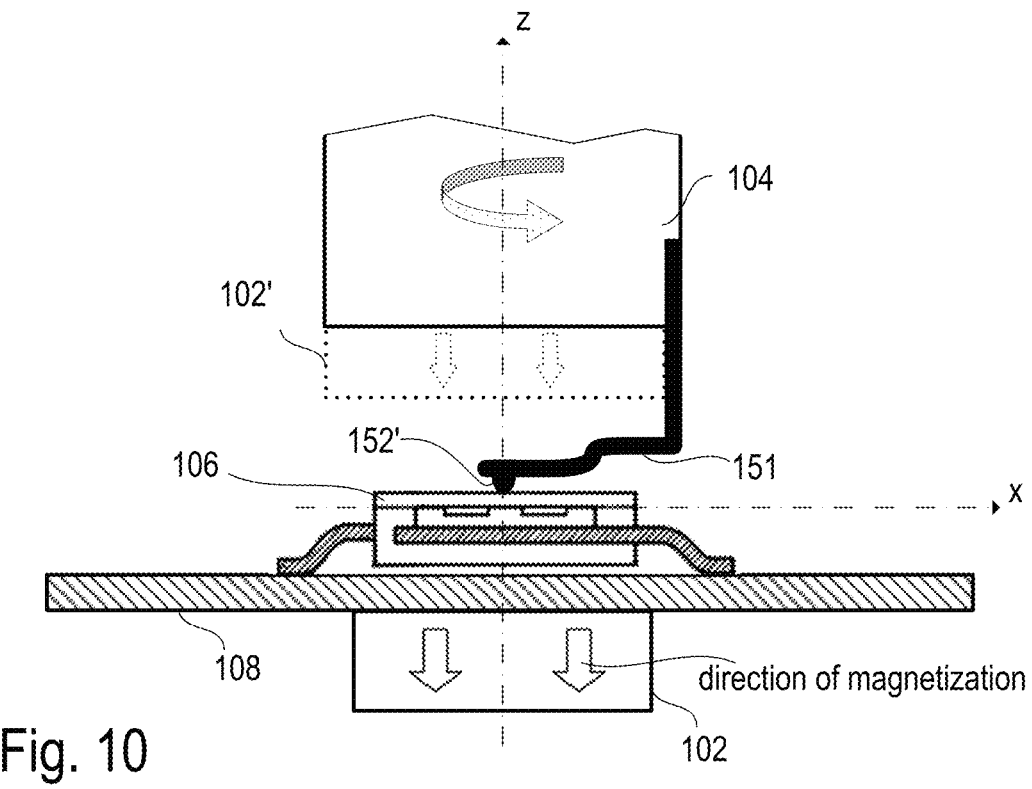
FIG. 10 illustrates a longitudinal section through a further embodiment of an angular position sensor arrangement with a flexible spring of magnetic material.
Figure 11:
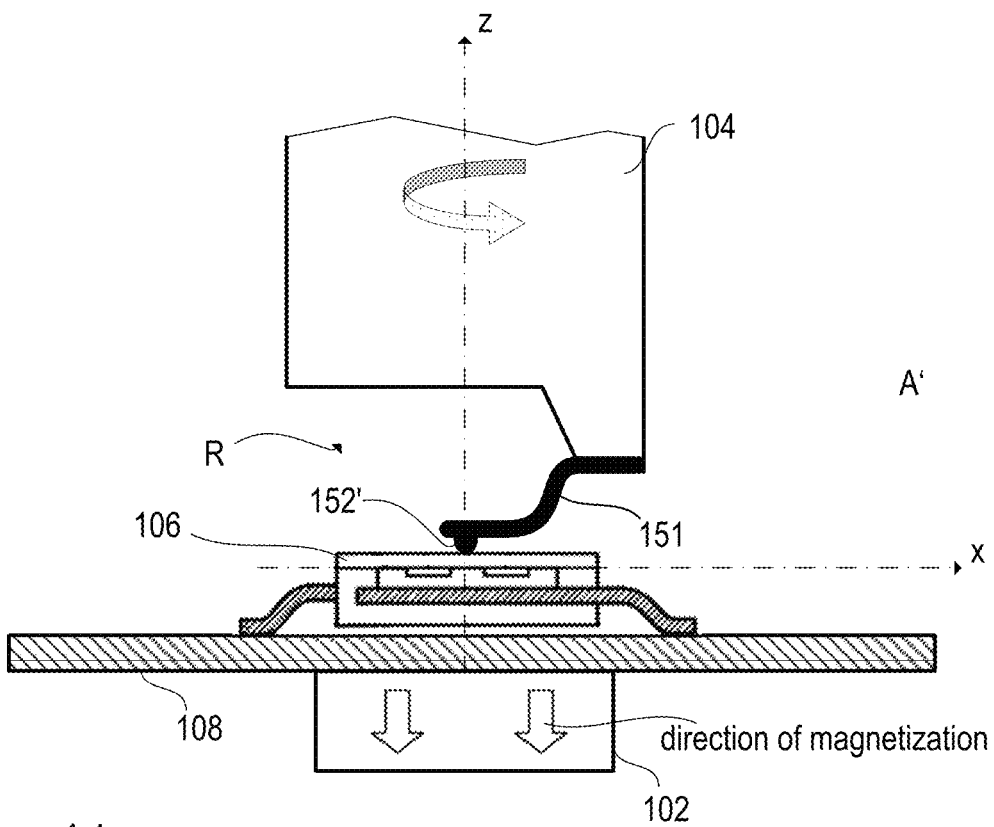
FIG. 11 illustrates a longitudinal section through a further embodiment of an angular position sensor arrangement with a flexible spring of magnetic material.

In the embodiment of FIG. 10, the flat spring 151 is bent by 90° and directly attached to the shaft 104 instead of using a separate anchor element (such as, e.g., anchor element 150 in FIG. 8). For example, the portion of the flat spring 151 which is attached to the shaft 101 may be inserted in a groove, which extends axially in the circumferential surface of the shaft, and screwed, glued, welded or fixed otherwise to the shaft. Generally, it is also possible to emboss the flat spring 152 at the rotation axis instead of attaching a separate spacer. In this case the spacer is implemented as an embossment 152' as shown in the examples of FIGS. 10 and 11. In the example of FIG. 11, the flat spring has an S-shape and is attached to the front side of the shaft 104 instead of to the circumferential surface as in the previous example of FIG. 10. In this case an additional asymmetry (symmetry of order 1) is achieved by an asymmetric recess R in the front side of the shaft 104. The effect of the recess R on the resulting magnetic field "seen" by the magnetic field sensors is similar to the effect of the front side of the shaft being tilted as in the example of FIG. 1. As in the previous embodiments a permanent magnet 102 may be attached to the PCB 108. Additionally or alternatively, another permanent magnet 102' may be attached to the shaft 104 (shown in dotted lines in FIG. 10).

In the embodiments shown herein, the sensor chip 110 is closer to the spacer 152 or the embossment 152' than the leadframe 116, which ensures a low distance (air gap) between shaft end-portion and magnetic field sensor element integrated in the sensor chip 106. Such an arrangement may help to maximize the level of the magnetic field at the sensor elements and the signal output of the magnetic field sensor elements. In other embodiments, however, the sensor chip may be reversed so that an exposed metal die-paddle is contacted by the spacer 152 or embossment 152' instead of the plastic portion (mold compound) of the sensor package. In this case the metal die-paddle protects the sensor package 106 against abrasion caused by the rotating spacer or embossment. Even if the die-paddle were not exposed (i.e. it is covered by mold compound and therefore the spacer 152 or embossment 152' is in contact with the abrasive mold compound) it would still protect the chip from the spring 151. In an alternative embodiment, the magnetic field sensor package 106 can be mounted to the bottom side of the PCB, while the shaft faces the front side of the component board, and the spacer 152 is in contact with the front side surface of the PCB or with a metal plate or similar structure mounted to the front side of the PCB. In this embodiment there is no friction between the rotating spacer and the abrasive mold compound of the sensor package and the sensor package is protected from the rotating spacer 152 by the PCB inbetween.

Generally, the permanent magnets can be mounted on the PCB 108 (see FIGS. 10 and 11), the sensor package 106 (see FIG. 1), the shaft 104 (see FIG. 6), the flat spring 151 (e.g. on its flexible end), or between shaft and spring, or even on the anchor element 150. The permanent magnets can have various shapes such as the shape of a ring, pill, cylinder, cuboid with various directions of magnetization (purely axial or purely radial or combinations of axial and diametrical or axial and radial). Further embodiments may be created by combining various aspects of the embodiments discussed above.

Figure 12:
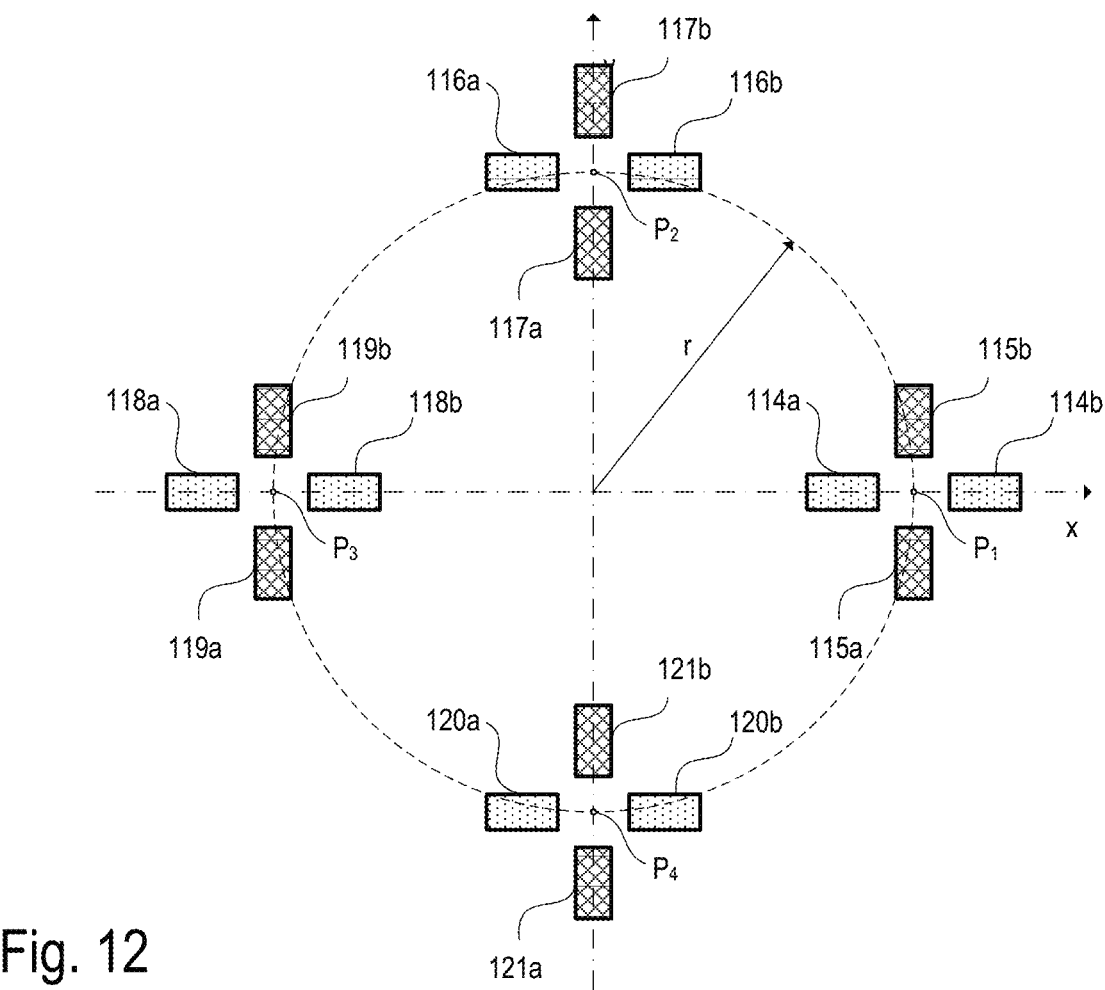
FIGS. 12-14 illustrate different exemplary arrangements of magnetic field sensor elements to be used in a magnetic angular position sensor.
Figure 13:
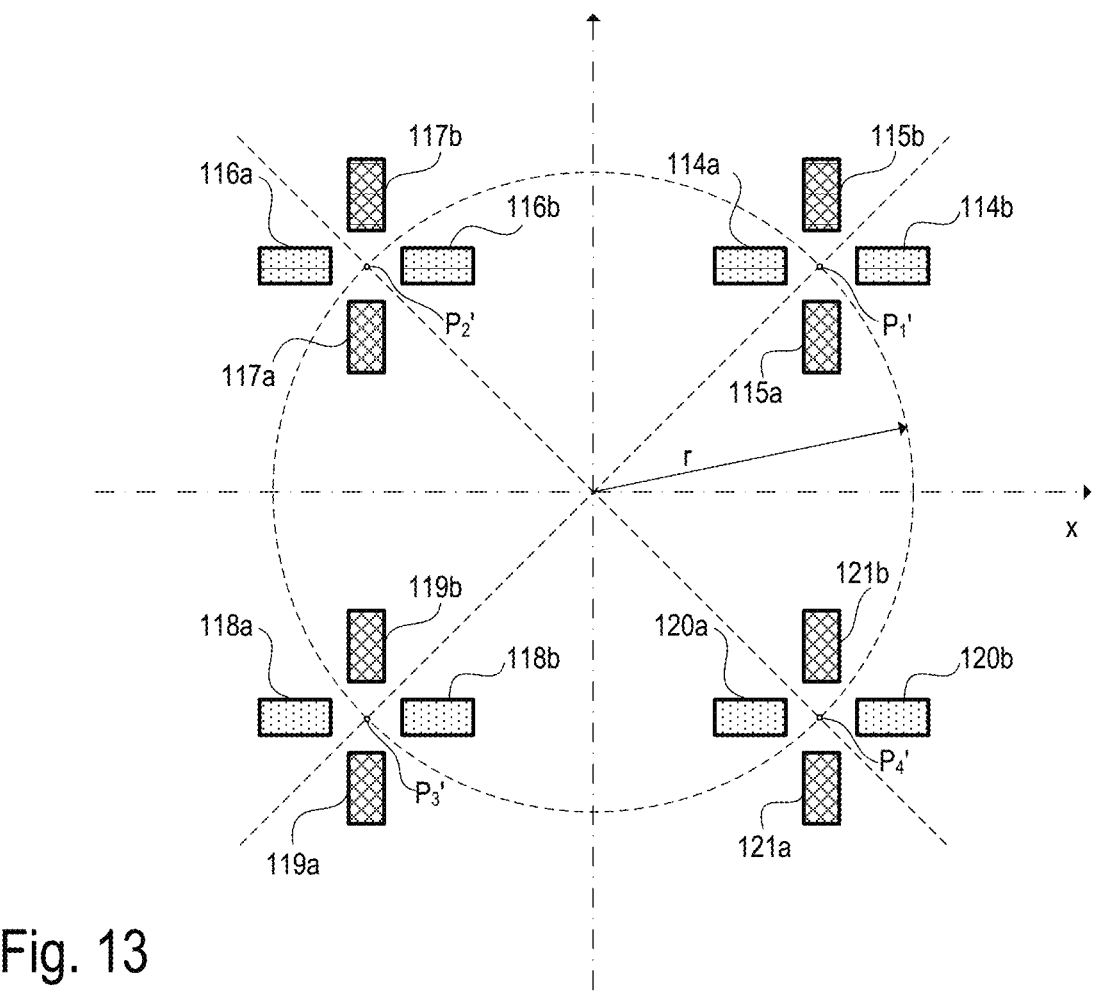
Figure 14:
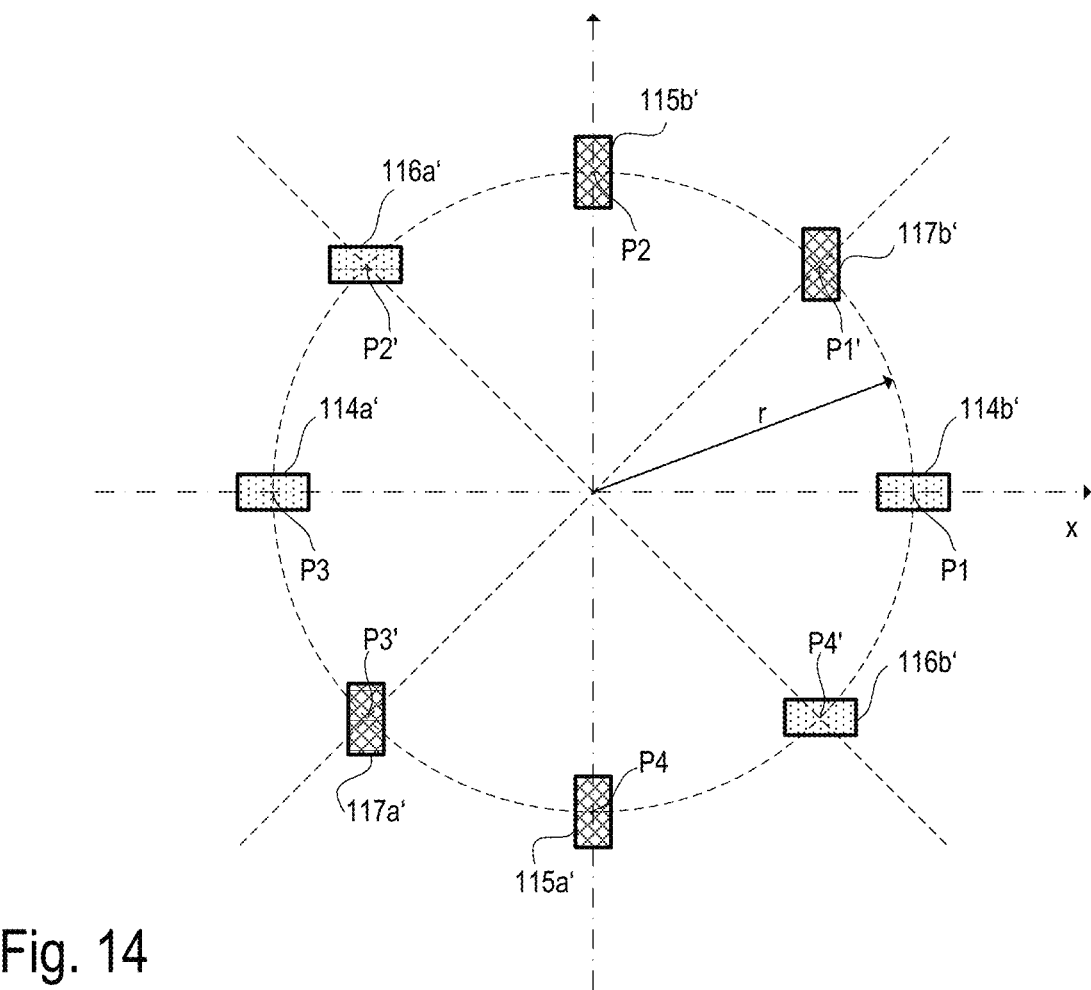

The following FIGS. 12 to 14 illustrate different arrangements (layouts) of the magnetic field sensor elements integrated in at least one sensor chip 110 (see, e.g. FIGS. 3, 6, and 8). Generally, at least four magnetic field sensor elements are used in the embodiments described herein, although the embodiments shown in FIGS. 12 to 14 use eight or sixteen magnetic field sensor elements (wherein, in the latter case, two respective magnetic field sensor elements are arranged closely adjacent to or adjoining each other and their sensor output is averaged, see FIGS. 12 and 13). The sensor chip 110 defines a sensor plane which is arranged substantially perpendicular to the rotation axis (z-axis) and in which the magnetic field sensor elements are arranged. Generally, a first and a second one of the magnetic field sensor elements are spaced apart from each other and are only sensitive to magnetic field components in a first direction (e.g. x-direction) and a third and a fourth one of the magnetic field sensor elements are also spaced apart from each other and are only sensitive to magnetic field components in a second direction (e.g. y-direction). As mentioned above, the x-direction, the y-direction and the z-direction (defined by the rotation axis) form a Cartesian coordinate system. Thus, the first and the second directions are non-parallel and perpendicular to the rotation axis. As mentioned above, the sensor elements used in the embodiments described herein are substantially insensitive to magnetic field components perpendicular to the sensor plane (and thus parallel to the rotation axis). In the embodiments described herein, the individual magnetic field sensor elements may be arranged, for example, along a circle of radius r, which is concentric to the rotation axis. At (or very close to) angular positions 0° (i.e. at $P_1=(r, 0)$), 90° (i.e. at $P_2=(0, r)$), 180° (i.e. at $P_3=(-r, 0)$), and 270° (i.e. at $P_4=(0, -r)$) magnetic field sensor elements are provided, which are sensitive to magnetic field components in the x- and y-direction but insensitive in z-direction ($H_X$ sensor elements and $H_Y$ sensor elements).

In the embodiments described herein, sensor elements 114a, 114b, 116a, 116b, 118a, 118b, 120a, 120b are sensitive to magnetic field components in y-direction and are thus referred to as $H_Y$ sensor elements. Similarly, sensor elements 115a, 115b, 117a, 117b, 119a, 119b, 121a, 121b are sensitive to magnetic field components in x-direction and are thus referred to as $H_X$ sensor elements. Theoretically, the magnetic field sensor elements (e.g. sensor elements 114a, 114b, 115a, and 115b in FIG. 12) should be provided at the very same spot (at locations $P_1$, $P_2$, $P_3$, $P_4$) on the circle with radius r, which is difficult to implement as the magnetic field sensor elements would have to be stacked. The example of FIG. 12 illustrates one implementation, according to which two $H_X$ sensor elements and two $H_Y$ sensor elements are arranged symmetrically and closely adjacent to the angular positions $P_1$, $P_2$, $P_3$, and $P_4$ on the circle of radius r. In FIG. 12, pairs of $H_Y$ sensor elements 114a, 114b, 116a, 116b, 118a, 118b, and 120a, 120b are aligned with the x-axis (sensor elements 114a, 114b, 118a, 118b) or with an axis parallel to the x-axis (sensor elements 116a, 116b, 120a, 120b), and each pair is arranged symmetric to the respective position $P_1$, $P_2$, $P_3$, and $P_4$. The magnetic field components $H_X$ and $H_Y$ for a specific position $P_1$, $P_2$, $P_3$, and $P_4$ can be obtained by averaging the output signals of the sensor elements of each pair. For example, the output signals of $H_Y$ sensor elements 114a and 114b are averaged to obtain a measurement of the y-component $H_Y$ of the magnetic field at position $P_1$. Analogously, the output signals of $H_X$ sensor elements 121a and 121b are averaged to obtain a measurement of the x-component $H_X$ of the magnetic field at position $P_4$. In essence, the sensor elements 114a and 114b can be regarded as one single (but distributed) $H_Y$ sensor element at the location P1. Analogously, the sensor elements 117a and 117b can be regarded as one single $H_X$ sensor element at the location P2, etc. In accordance with another implementation the sensor elements are not "split" into pairs, but the $H_X$ and $H_Y$ sensor elements are provided so close to the desired positions $P_1$, $P_2$, $P_3$, and $P_4$, that the deviation between actual sensor position and desired position ($P_1$, $P_2$, $P_3$, and $P_4$) is negligible. The example of FIG. 13 is essentially the same as the previous example of FIG. 12. In FIG. 13, however, the positions $P_1'$, $P_2'$, $P_3'$, and $P_4'$, at which the magnetic field components $H_X$ and $H_Y$ are measured, are shifted by 45° as compared with the positions $P_1$, $P_2$, $P_3$, and $P_4$ shown in FIG. 12. Generally, the spacing between different sensing locations on the sensor plane is at least as high as (or at least twice as high as) the largest dimension of a single magnetic field sensor element.

In the example of FIG. 14 one magnetic field sensor element is provided on the circle with radius r at each one of the following angular positions on the circle: 0°, 45°, 90°, 135°, 180°, 225°, 270°, and 315°. One $H_Y$ sensor element is provided on the circle an angle of 0°, 135°, 180°, and 315° ($H_Y$ sensor elements 114b', 116a', 114a', 116b'). One $H_X$ sensor element is provided on the circle an angle of 45°, 90°, 225°, and 270° ($H_X$ sensor elements 117b', 115b', 117a', 115a'). As only a single magnetic field sensor element is provided at each position, the magnetic field sensor elements can be placed exactly on the desired position. For all three embodiments shown in FIGS. 12 to 14, one important aspect is that only $H_X$ and $H_Y$ sensor elements are used which have a sensitivity in a direction perpendicular to the rotation axis (z-direction) and which are not affected by magnetic field components in z-direction. Furthermore, the individual magnetic field sensor elements are aligned such that they measure magnetic field components in the x-direction and the y-direction and not in an arbitrary radial direction (e.g. along the 45° line through points Pr and $P_3'$ in FIG. 13). In practice, it may be difficult to exactly align a sensor element in an arbitrary radial direction, whereas it is simpler to align it x- and y-directions, because x- and y-directions are parallel to the edges of the chip and this is the usual grid along which electronic devices are aligned in common microelectronic technologies. It should be noted, however, that the output signals of diametrically arranged pairs of magnetic field sensor elements 114a' 114b', 115a' 115b', 116a' 116b', and 117a' 117b' are not averaged, whereas in the examples of FIGS. 12 and 13 the output signals of corresponding pairs of magnetic field sensor elements 114a, 114b, 115a, 115b, etc. are averaged to obtain one average output signal.

Moreover, it should be clear that other alignments of the sensor elements like radial or azimuthal orientation are also possible, because by straightforward transformation of coordinate systems one can express a field in a first direction as a combination of field components in at least two non-parallel other directions. It is also not necessary to place all sensor elements on a circle with center on the rotation axis as shown in the present embodiment (the center point may be defined by projecting the rotation axis onto the sensor plane). In principle, the sensor elements may be placed on regular or even irregular grids in the x-y-plane to sample the field components $H_X(x,y)$ or $H_Y(x,y)$ or $H_R(x,y)$ (i.e. the radial component) or $H_{PSI}(x,y)$ (i.e. the azimuthal component) and reconstruct the functions $H_X(x,y)$ or $H_Y(x,y)$ or $H_R(x,y)$ or $H_{PSI}(x,y)$ by interpolation or approximation like least square error fits or similar mathematical methods.

The following description deals with the algorithms, which may be used to derive an angular position of the shaft from the output signals of the magnetic field sensor elements arranged according to the layouts shown in FIGS. 12 to 14. There are numerous possibilities to determine the angular position, and only a few examples (for a two-fold symmetry, i.e. N=2) are discussed as representatives of a wide class of algorithms. Generally, the embodiments described herein may include circuitry, which is coupled to the (at least four) magnetic field sensor elements integrated in the sensor chip 110 and which is configured to calculate an angular position of the shaft by combining the output signals of the magnetic field sensor elements. One common aspect of these approaches is that two or more output signals of the magnetic field sensor components are combined in such a manner that two signals are obtained, which (1) have a defined amplitude relation (e.g. equal amplitudes), (2) have a defined phase lag (e.g. 90°), and (3) are insensitive against homogeneous disturbing magnetic fields. The last property may be achieved by using a differential measurement. That is, the output signals of a pair of $H_X$ sensor elements (or a pair of $H_Y$ sensor elements) are subtracted to obtain a differential signal in which the signal components resulting from a homogenous disturbing field are cancelled out. In the example of FIG. 14 differential signals can be obtained from a pair of sensor elements, which are located spaced apart from each other at two diametrically opposing positions on the circle with radius r (i.e. 114a' and 114b', 115a' and 115b', 116a' and 116b', etc.). Instead of a subtraction, a weighted sum of output signals of different magnetic field sensor elements may be used (wherein negative weight factors are possible). As mentioned, the magnetic field sensor elements need not necessarily be arranged along a circle. Generally, magnetic field components in the first direction (e.g. x-direction) are sensed at least at a first and a second location in the sensor plane (e.g. locations P1 and P3 in the example of FIG. 12). Additionally, magnetic field components in the second direction (e.g. y-direction) are sensed at at least a third and a fourth location in the sensor plane (e.g. locations P1 and P4 in the example of FIG. 12). The sought angular position of the shaft with respect to its rotation axis can then be calculated based on the difference of the magnetic field components at the first and the second location and on the difference of the magnetic field components at the third and the fourth location. The mentioned differences are used to implement the above-mentioned differential measurement. As such, the angular position sensor system may be regarded as a kind of gradiometer.

Referring to the example of FIG. 12, a signal $S_{COS}$, which is proportional to the cosine of twice the angular shaft position φ ($S_{COS}$~cos(2φ)), is obtained by calculating ($H_X$(0°)−$H_X$(180°))−($H_Y$(90°)−$H_Y$(270°)). A signal $S_{SIN}$, which is proportional to the sine of twice the angular shaft position φ ($S_{SIN}$~sin(2φ)), is obtained by calculating $H_Y$(0°)−$H_Y$(180°). Another signal $S_{SIN'}$, which is proportional to the sine of twice the angular shaft position φ, is obtained by calculating $H_X$(90°)−$H_X$(270°). The cosine signal $S_{COS}$ and any of the two sine signals $S_{SIN}$, $S_{SIN'}$ may be used to calculate the tangent function tan(2φ) (ratio $S_{SIN}/S_{COS}$ or $S_{SIN'}/S_{COS}$) of the angular position 2φ, from which the sought angular position can be calculated as the arc tangent of, e.g., $S_{SIN}/S_{COS}$. For example, the CORDIC algorithm may be used to implement the arc tangent function. When using the layout as shown in FIG. 12, the magnetic field component $H_Y$(0°) is obtained by averaging the output signals of magnetic field sensor elements 114a and 114b. The same is done for the $H_X$ components and other positions of magnetic field sensor elements. The factor 2 in the expressions cos(2φ), sin(2φ), and tan(2φ) are due to the mentioned two-fold symmetry of the set-up and the angular position can only be unambiguously determined within a range from 0° to 180°, which may be sufficient when the on-axis angular position sensor is used to control certain types of BLDC motors.

When using the layout in accordance with the example of FIG. 13, the signal $S_1$ and $S_2$ may be calculated as $$S_1 = (H_X(45°) - H_X(225°+)) + (H_Y(315°) - H_Y(135°)), \text{ and}$$

$$S_2 = (H_X(135°) - H_X(315°+)) + (H_Y(45°) - H_Y(225°)), \text{ and}$$

wherein the sum of $S_1$ and $S_2$ equals A·sin(2φ) and the difference $S_1 - S_2$ equals A·cos(2φ). Similar as in the previous example the angular position φ may be derived as ½·arctan(($S_1+S_2$)/($S_1-S_2$)).

When using the layout in accordance with the example of FIG. 14, a sine signal $S_{SIN}$ and a cosine signal $S_{COS}$ may be calculated as $$S_{SIN} = (H_X(270°) - H_X(90°)) - (H_Y(0°) - H_Y(180°)), \text{ and}$$

$$S_{COS} = \sqrt{2} \cdot SC - S_{SIN},$$

wherein SC=($H_X$(225°)−$H_X$(45°))−($H_Y$(315°)−$H_Y$(135°)). As mentioned, the examples discussed above relate to a two-fold symmetry of the shaft end-portion. It is noted that similar expressions can be found for signals suitable in measurement set-ups with a symmetry of order one or order three or higher. In the equations above, the sensing locations P1, P1', P2, P2', P3, P3', P4, and P4' are represented by a corresponding angle (0° denotes P1, 45° denoted P1', 90° denoted P2, 135° denotes P2', 180° denoted P3, 225° denoted P3', 270° denoted P4, and 315° denotes P4'). Together with the radius r the angle unambiguously defines the respective sensing locations P1, P1', P2, P2', P3, P3', P4, and P4'.

Figure 15:
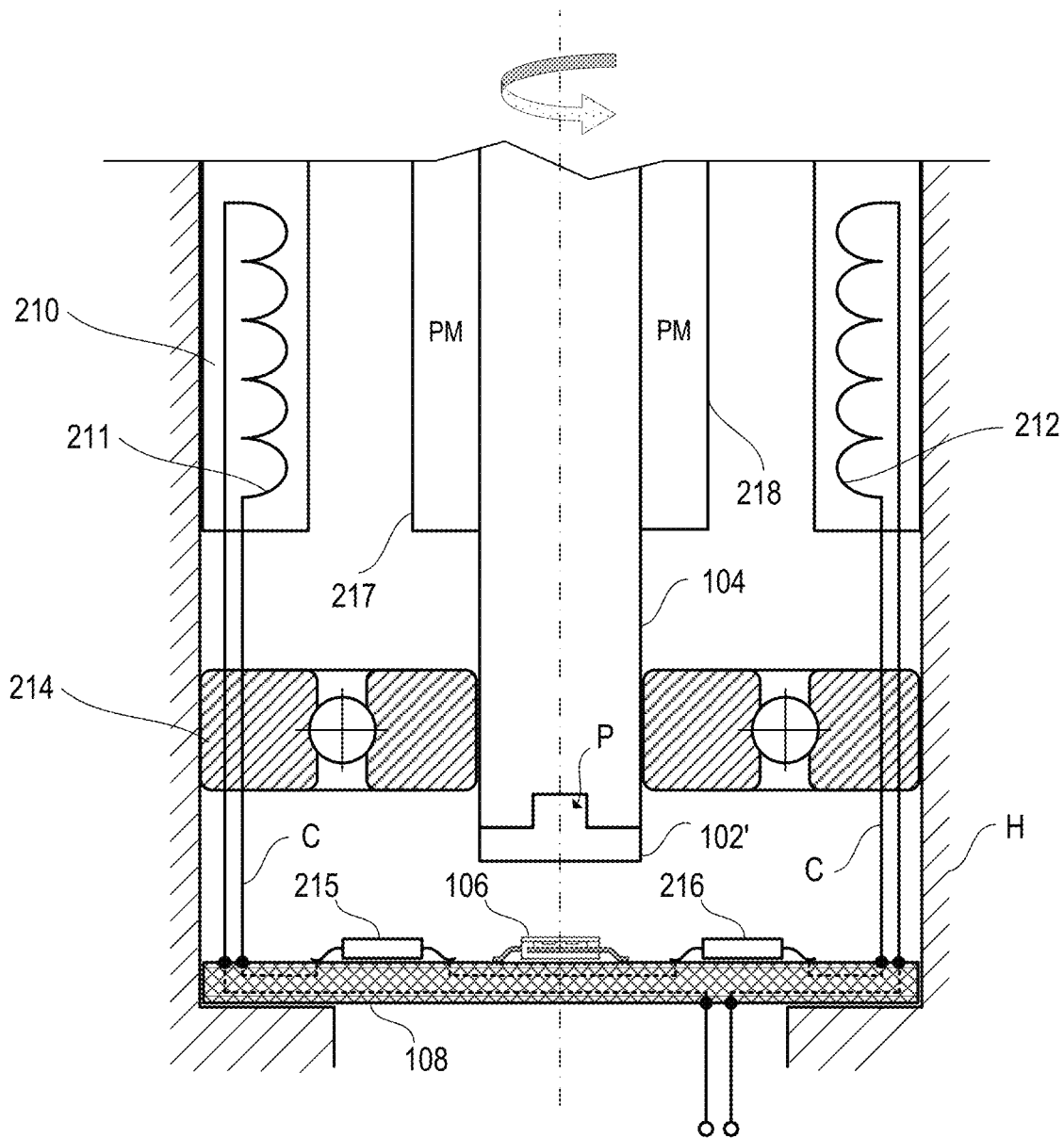
FIGS. 15-16 illustrate two different examples of how an on-axis angular position sensor can be used in a brushless DC (BLCD) motor.
Figure 16:
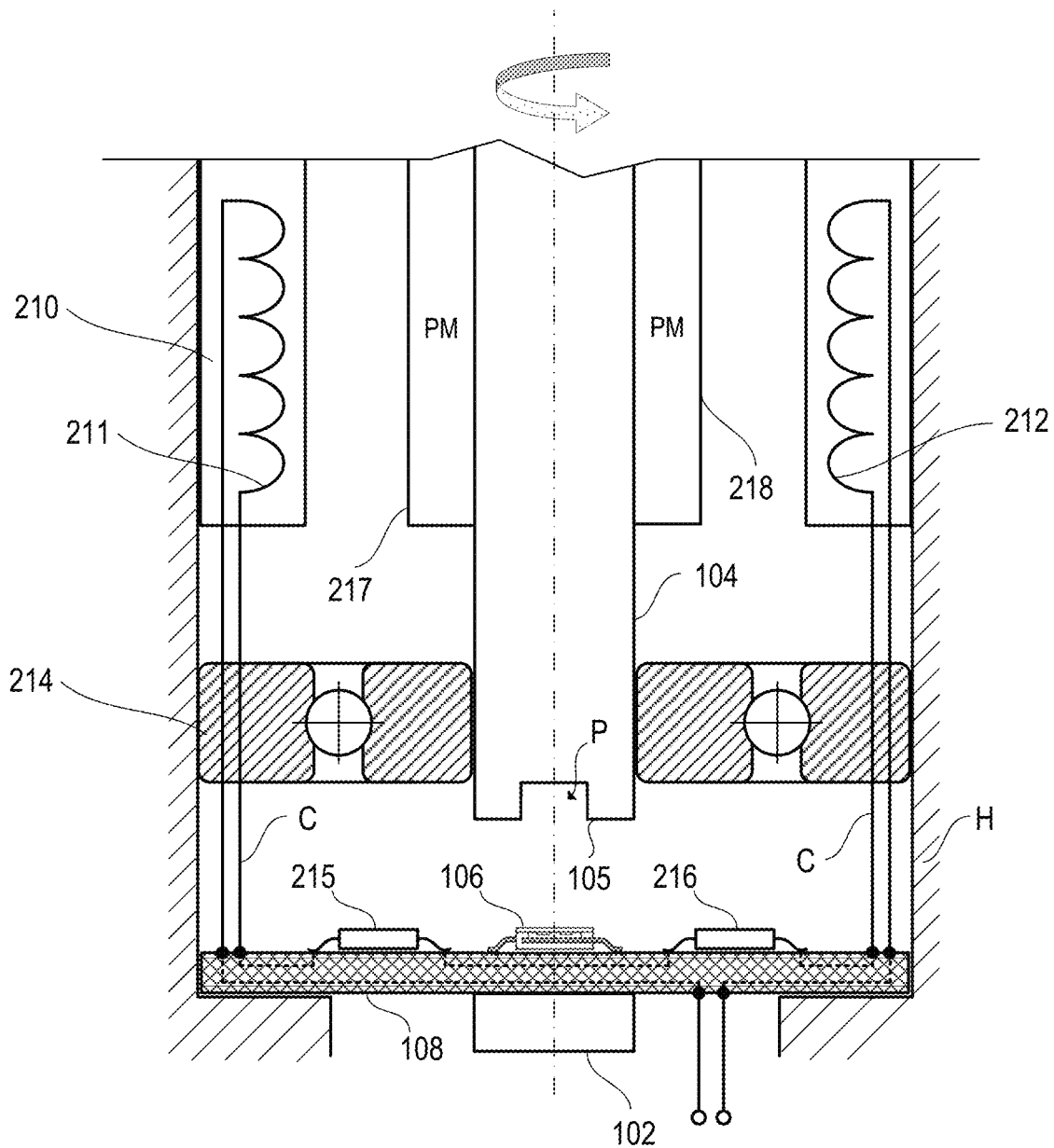

As mentioned above, a two-fold symmetry of the shaft end portion may be sufficient in at least some applications, in which the rotational motion BLDC motor is to be controlled. FIGS. 15 and 16 illustrate two different examples of how an on-axis angular position sensor can be arranged in a brushless DC (BLCD) motor assembly. FIG. 15 is a sectional view of a portion of a BLDC motor, wherein the sectional plane runs through the rotation axis of the shaft 104. It is noted, however, that FIG. 15 is not in scale and has to be regarded as a schematic sketch. Also shown in FIG. 15 are the permanent magnets (PM) 217 and 218, which are directly or indirectly attached to the shaft 114 along its circumference. The shaft 104 may be supported by at least two bearings, wherein bearing 214 is a ball bearing in the depicted example. However, other types of bearings may also be used dependent on the actual implementation. Shaft 104 and the PMs attached to the shaft form the rotor (armature) of the motor. The stator 210 of the motor includes coils 211 and 212, which are supplied with current to control the angular motion of the motor.

As in the examples described above, the end-portion of the shaft 104 has a recess P similar to the examples shown in FIGS. 3 and 4, wherein a permanent magnet 102' is attached to the shaft 104 similar to the example discussed above with reference to FIG. 6. To realize a compact design, the magnetic field sensors (represented in FIG. 15 by sensor chip 106) used to form an on-axis angular position sensor are arranged on PCB 108 together with the power electronics used to generate the operating current supplied to the stator coils 211, 212.

As can be seen from FIG. 15, the PCB directly faces the front side of the shaft 104 (i.e. the shaft end portion), and the magnetic field sensor elements are, in the present example, arranged on the PCB 108 symmetrically to the rotation axis as shown in FIGS. 12 to 14. The electrical contacts C (soldering contacts, pins) of the stator coils 211, 212 protrude from the stator towards the PCB 108, which allows for direct electrical connection between the coils 211, 212 and the PCB 108. The PCB 108 may be supported at an inner surface of a motor housing H that faces the stator 210 of the motor.

The example of FIG. 16 is essentially the previous example of FIG. 15, except that the permanent magnet 102' attached to the shaft end portion is omitted and a permanent magnet 102 is instead arranged on the back side of the PCB 108 similar to the example shown in FIG. 3. It is understood that any other angular position sensor arrangement may be used in a BLDC motor assembly as shown in the FIGS. 15 and 16.

The PCB 108 carries the sensor chip 106 as well as power devices 215, 216, which provide the (controlled) load current supplied to the stator coils 211, 212. The distance between the magnetic field sensor elements (in the sensor chip 106) and the power devices 215, 216, or between the magnetic field sensor elements and load current lines on the PCB 108 is often comparably small (e.g. less than 10 mm or 20 mm) so that the magnetic field generated by the current traces or power devices is strongly inhomogeneous at the locations of the magnetic sensor elements. Therefore, a common gradiometer is not enough to eliminate the effect of the disturbing magnetic fields caused by the load current lines and the power devices. However, the load current lines and the power devices are (at least approximately) located at the same z-position (i.e. the same axial position) as the magnetic field sensor elements (and therefore the magnetic field lines intersect the sensor elements almost vertically as sketched in FIG. 2). The angular position measurement becomes very robust against these disturbances if the magnetic field sensor elements does not respond to those magnetic field components in z-direction. Therefore, the embodiments described herein include gradiometer set-ups that are sensitive to magnetic field components in x- or y-directions.

Although the invention has been illustrated and described with respect to one or more implementations, alterations and/or modifications may be made to the illustrated examples without departing from the spirit and scope of the appended claims. In particular regard to the various functions performed by the above described components or structures (units, assemblies, devices, circuits, systems, etc.), the terms (including a reference to a "means") used to describe such components are intended to correspond—unless otherwise indicated—to any component or structure, which performs the specified function of the described component (e.g., that is functionally equivalent), even if not structurally equivalent to the disclosed structure, which performs the function in the herein illustrated exemplary implementations of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising"

I claim:

1. A method for measuring an angular position of a shaft that includes a soft magnetic shaft end portion, comprising:
   magnetizing the shaft end portion, the shaft end portion being formed such that magnetic field components in a first and a second direction in a sensor plane, which is substantially perpendicular to a rotation axis of the shaft, are rotationally symmetric with an order N, N being a finite integer ≥1;
   sensing magnetic field components in the first direction at a first and a second location in the sensor plane, the second location being different from the first location;
   sensing magnetic field components in the second direction at a third and a fourth location in the sensor plane, the fourth location being different from the third location; and
   calculating an angular position of the shaft with respect to the rotation axis of the shaft based on (i) a difference of the magnetic field components at the first and the second location, and (ii) a difference of the magnetic field components at the third and the fourth location.

2. The method of claim 1, wherein the act of sensing the magnetic field components comprises:
   generating a first sensor signal using at least a first magnetic field sensor element configured to sense magnetic field components in the first direction at the first location;
   generating a second sensor signal using at least a second magnetic field sensor element configured to sense magnetic field components in the first direction at the second location;
   generating a third sensor signal using at least a third magnetic field sensor element configured to sense magnetic field components in the second direction at the third location; and
   generating a fourth sensor signal using at least a fourth magnetic field sensor element configured to sense magnetic field components in the second direction at the fourth location.

3. The method of claim 2, wherein the act of calculating the angular position of the shaft comprises:
   calculating a fifth sensor signal representing a difference between the first sensor signal and the second sensor signal;
   calculating a sixth sensor signal representing a difference between the third sensor signal and the fourth sensor signal; and
   calculating the angular position of the shaft based on the fifth sensor signal and the sixth sensor signal.

4. The method of claim 2, further comprising:
   arranging the first magnetic field sensor element, the second magnetic field sensor element, the third magnetic field sensor element, and the fourth magnetic field sensor element in the sensor plane around a center point defined by a projection of the rotation axis onto the sensor plane.

5. The method of claim 2, wherein the act of magnetizing the shaft end portion comprises magnetizing the shaft end portion with a magnetic field source comprising a magnetic field source comprising a first permanent magnet and at least a second permanent magnet;
   arranging the first magnetic field sensor element, the second magnetic field sensor element, the third magnetic field sensor element, and the fourth magnetic field sensor element in a sensor chip in a chip package, which is attached to a circuit board;
   attaching the first permanent magnet to one of the chip package or the circuit board; and
   attaching the second permanent magnet to the shaft end portion.

6. The method of claim 2, further comprising:
   arranging the first magnetic field sensor element, the second magnetic field sensor element, the third magnetic field sensor element, and the fourth magnetic field sensor element symmetrically about a circle, which is coaxial with the rotation axis.

7. The method of claim 1, wherein the act of magnetizing the shaft end portion comprises magnetizing the shaft end portion with a magnetic field source comprising at least one permanent magnet.

8. The method of claim 7, further comprising:
   arranging the first magnetic field sensor element, the second magnetic field sensor element, the third magnetic field sensor element, and the fourth magnetic field sensor element in a sensor chip in a chip package, which is attached to a circuit board; and
   attaching the at least one permanent magnet to one of the chip package, the circuit board, or the shaft end portion.

9. The method of claim 1, further comprising:
   providing the shaft end portion having at least one groove or at least one protrusion arranged in or on a front side of the shaft end portion, the groove or the protrusion being shaped such that the shaft end portion has a rotational symmetry of the order N.

10. The method of claim 1, further comprising:
    providing the shaft end portion having a spring rotating synchronously with the shaft, the spring being resilient in an axial direction of the rotation axis.

11. The method of claim 10, wherein the spring is non-resilient in directions perpendicular to the rotation axis.

12. The method of claim 10, further comprising:
    arranging the first magnetic field sensor element, the second magnetic field sensor element, the third magnetic field sensor element, and the fourth magnetic field sensor element in a sensor chip; and
    arranging the spring between the sensor chip and a front side of the shaft end portion,
    wherein the spring is supported on a chip package of the sensor chip via a spacer.

13. The method of claim 12, further comprising:
attaching the spacer to the spring,
wherein the spring is configured to exert an axial force on the chip package of the sensor chip.

14. The method of claim 12, further comprising:
forming the spacer via an embossment of the spring,
wherein the spring is configured to exert an axial force on the chip package of the sensor chip.

15. A magnetic angular position sensor system for measuring an angular position of a shaft that includes a soft magnetic shaft end portion, comprising:
a magnetized shaft end portion formed such that magnetic field components in a first and a second direction in a sensor plane, which is substantially perpendicular to a rotation axis of the shaft, are rotationally symmetric with an order N, N being a finite integer ≥1;
a sensor chip comprising a plurality of magnetic field sensor elements, the sensor chip being configured to:
sense magnetic field components in the first direction at a first and a second location in the sensor plane, the second location being different from the first location; and
sense magnetic field components in the second direction at a third and a fourth location in the sensor plane, the fourth location being different from the third location; and
circuitry configured to calculate an angular position of the shaft with respect to the rotation axis of the shaft based on (i) a difference of the magnetic field components at the first and the second location, and (ii) a difference of the magnetic field components at the third and the fourth location.

16. The sensor system of claim 15, wherein the plurality of magnetic field sensor elements comprises:
a first magnetic field sensor element configured to generate a first sensor signal indicative of sensed magnetic field components in the first direction at the first location;
second magnetic field sensor element configured to generate a second sensor signal indicative of sensed magnetic field components in the first direction at the second location;
a third magnetic field sensor element configured to generate a third sensor signal indicative of sensed magnetic field components in the second direction at the third location; and
a fourth magnetic field sensor element configured to generate a fourth sensor signal indicative of sensed magnetic field components in the second direction at the fourth location.

17. The sensor system of claim 16, wherein the circuitry is configured to calculate the angular position of the shaft by (i) calculating a fifth sensor signal representing a difference between the first sensor signal and the second sensor signal, (ii) calculating a sixth sensor signal representing a difference between the third sensor signal and the fourth sensor signal, and (iii) calculating the angular position of the shaft based on the fifth sensor signal and the sixth sensor signal.

18. The sensor system of claim 16, wherein the first magnetic field sensor element, the second magnetic field sensor element, the third magnetic field sensor element, and the fourth magnetic field sensor element are arranged in the sensor plane around a center point defined by a projection of the rotation axis onto the sensor plane.

19. The sensor system of claim 15, wherein the shaft end portion has at least one groove or at least one protrusion arranged in or on a front side of the shaft end portion, the groove or the protrusion being shaped such that the shaft end portion has a rotational symmetry of the order N.

20. The sensor system of claim 15, wherein the shaft end portion has a spring rotating synchronously with the shaft, the spring being resilient in an axial direction of the rotation axis.

* * * * *